(12) United States Patent
Mafune et al.

(10) Patent No.: US 6,460,988 B1
(45) Date of Patent: Oct. 8, 2002

(54) INK SET, RECORDING METHOD, RECORDING UNIT, INK CARTRIDGE AND RECORDING APPARATUS

(75) Inventors: Kumiko Mafune, Kanagawa (JP); Tsuyoshi Kanke, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/877,025

(22) Filed: Jun. 11, 2001

(30) Foreign Application Priority Data

Jun. 12, 2000 (JP) .................................. 2000/176139

(51) Int. Cl.$^7$ .............................................. G01D 11/00
(52) U.S. Cl. .................... 347/100; 347/101; 106/31.47; 106/31.58; 523/160
(58) Field of Search ................................ 347/100, 101; 106/31–58, 31.42, 22 H; 523/160

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,248,852 A | 2/1981 | Wakabayashi et al. | 423/626 |
| 5,091,009 A | 2/1992 | Nogami et al. | 106/287.1 |
| 5,218,376 A | 6/1993 | Asai | 346/1.1 |
| 5,221,497 A | 6/1993 | Watanabe et al. | 252/313.2 |
| 6,152,969 A * | 11/2000 | Matsumoto et al. | 106/22 H |

FOREIGN PATENT DOCUMENTS

| | | | |
|---|---|---|---|
| EP | 1 063 268 A1 | 12/2000 | |
| EP | 1 067 155 A1 | 1/2001 | |
| JP | 55-27830 | 2/1980 | |
| JP | 02016171 A * | 1/1990 | C09D/11/00 |
| JP | 2783647 B2 | 8/1998 | |
| JP | 2803134 B2 | 9/1998 | |
| JP | 2881847 B2 | 4/1999 | |
| JP | 2000-109464 A | 4/2000 | |
| JP | 2000-169776 A | 6/2000 | |
| JP | 2000-256587 A | 9/2000 | |
| WO | WO 99 46341 | 9/1999 | |
| WO | WO 99-48981 | 9/1999 | |

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

An ink set which comprises a magenta ink and a cyan ink, where the magenta ink comprises a coloring material of general formula (I) and a compound of general formula (II), and the cyan ink comprises a coloring material having a copper phthalocyanine structure and a compound of general formula (II):

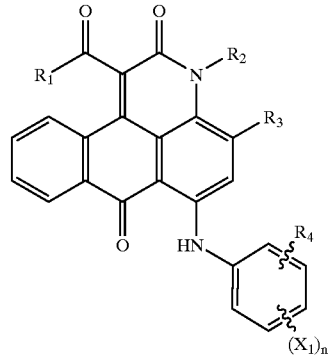

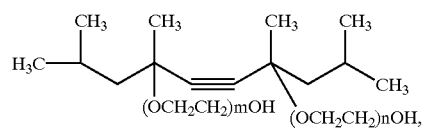

which can provide color images excellent in light fastness at a mixed color region of the magenta and the cyan inks.

14 Claims, 13 Drawing Sheets

AFTER 1μS

AFTER 2μS

AFTER 3μS

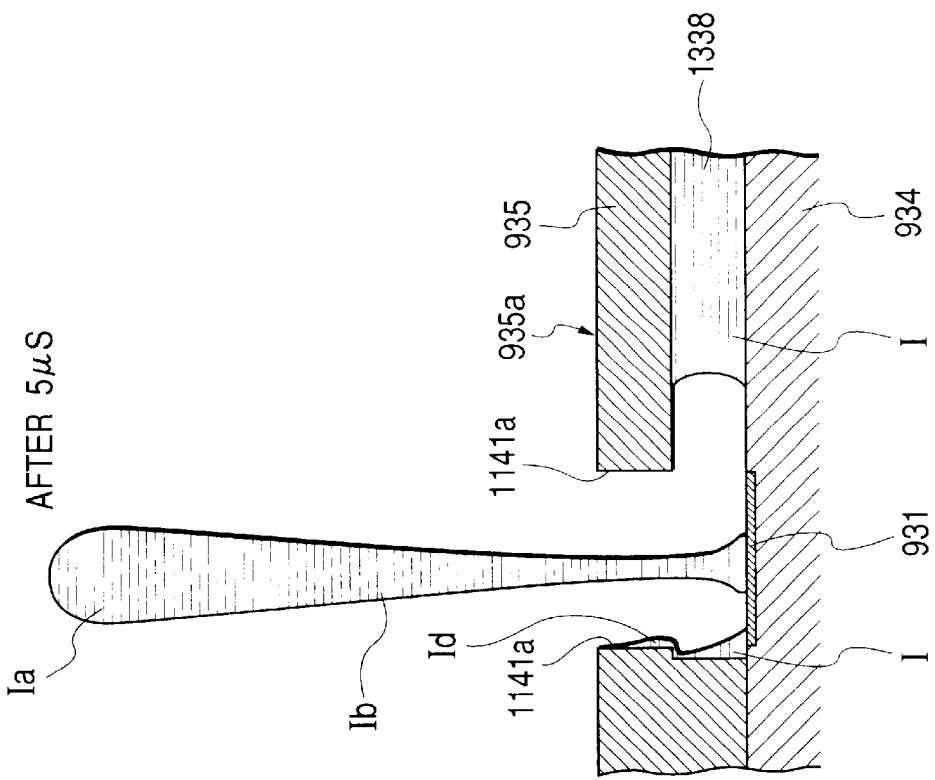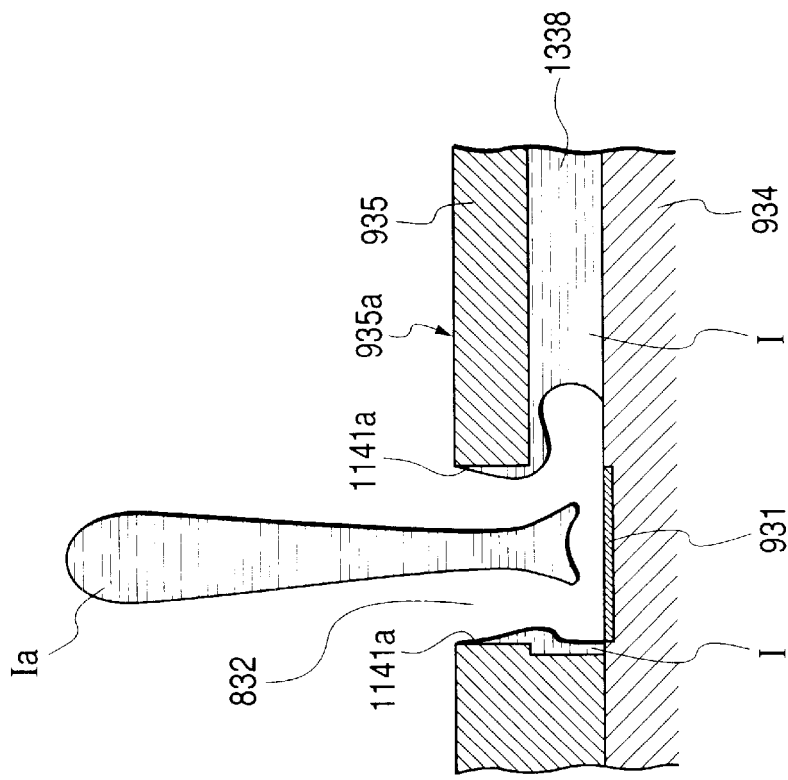

AFTER 6μS

AFTER 7μS

INK SET, RECORDING METHOD, RECORDING UNIT, INK CARTRIDGE AND RECORDING APPARATUS

BACKGROUND OF THE INVENTION

1. Field of the Invention

The present invention relates to an ink set, in particular, to an ink set usable for ink jet recording, where ink is ejected from orifices onto a recording medium according to the recording signals. This invention also relates to an ink jet recording method, an ink cartridge, a recording unit and an ink jet recording method using the ink.

2. Description of the Related Art

The ink jet color printing uses water base inks of magenta, cyan, yellow and black, which are prepared by dissolving dyes in a water base medium. In order to improve the durability of recorded images, images formed by the respective color inks must have excellent durability. However, it has been noted that azo dyes and xanthene dyes, which have excellent coloring and are commonly used as a coloring material for magenta ink, tend to have less light-fastness in comparison with other dyes used in other color inks when subjected to a light-fastness test of considerably longer exposure period than usual. It has been also noted that, when a magenta ink containing an azo dye is used with a cyan ink containing a copper phthalocyanine dye that is excellent in light-fastness and tone, fading of the magenta ink becomes conspicuous at the color mixed region in comparison with the region where the magenta dye is used alone. This may lead to the loss of color balance of the image, and hence, considerable deterioration of the image quality.

To solve the above problem, there has been proposed a magenta ink that would not cause photodeterioration where it is mixed with a cyan ink containing a copper phthalocyanine dye. Japanese Patent Application Laid-Open Nos. 2000-109464 (WO 9948981), 2000-169776 (WO 9946341) and 2000-256587 disclose that light-fastness of a magenta ink at a mixed portion with a cyan ink containing a copper phthalocyanine dye is improved by using in the magenta ink a dye having a skeletal structure similar to that used in the present invention.

Another problem in the color ink jet recording is the bleeding phenomenon, that is, when two different inks are adjacently provided on a recording material, they mix at the boundary to reduce the image quality.

SUMMARY OF THE INVENTION

In order to improve the light-fastness at the portion where magenta ink and cyan ink are mixed and to prevent bleeding at the boundary, the present inventors have tested various combination of coloring materials, solvents and additives.

They found that when an ethylene oxide adduct of acetylene glycol is added as an penetration-improving agent to prevent bleeding in a magenta ink containing the dye disclosed in, for example, Japanese Patent Application Laid-Open No. 2000-169776 (WO 9946341), and in a cyan ink containing a copper phthalocyanine dye, in addition to the bleeding-preventing effect, the light-fastness at the mixed portion of these inks is improved. In other words, the present invention has been made based on the finding of an unexpected effect of ethylene oxide adduct of acetylene glycol in the magenta ink and the cyan ink, i.e., improvement of the light-fastness at the mixed region of these two inks. Thereby, higher quality images with long durability can be obtained.

The reason why the light-fastness is improved by the presence of an ethylene oxide adduct of acetylene glycol in the magenta and cyan inks is not known yet, but presumed as follows. As shown in FIG. 24, when neither of magenta and cyan inks contain the ethylene oxide adduct of acetylene glycol, they penetrate at a similar rate into the recording medium 2303 in the mixed region, because of the low penetrability. As a result, the coloring materials of magenta and cyan inks are uniformly distributed within a certain depth of the mixed region. On the other hand, as shown in FIG. 23, when the magenta ink and the cyan ink contain an ethylene oxide adduct of acetylene glycol, the penetrability of both magenta ink and cyan ink is improved, so that both inks penetrate deeper into the recording material at the mixed region. The coloring material of the cyan ink (2301), however, has a more planar and bulky structure in comparison with the coloring material of the magenta ink (2302), and therefore, it cannot penetrate into the recording material deeper than the magenta coloring material. Thus the cyan coloring material existing near the surface of the recording material prevents the magenta coloring material that penetrated deeper into the recording material from being irradiated with light, thereby the fading of the magenta coloring material due to light can be alleviated.

Accordingly, one object of the present invention is to provide a new ink set which can form high quality color images with reduced bleeding at a boundary of two inks and with improved light-fastness at a mixed color region of cyan and magenta inks. Another object of the present invention is to provide an ink jet recording method, a recording unit, an ink cartridge and an ink jet recording apparatus for obtaining high quality color images with excellent light-fastness at a mixed color region of cyan and magenta inks.

According to an aspect of the present invention, there is provided an ink set comprising a magenta ink and a cyan ink, the magenta ink comprising a coloring material of the following general formula (I) and a compound of the following general formula (II), and the cyan ink comprising a coloring material having a copper phthalocyanine structure and a compound of the following general formula (II):

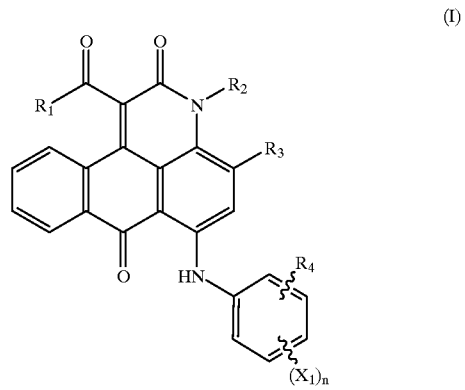

(I)

wherein $R_1$ is a substituted or unsubstituted aryl group, $R_2$ and $R_4$ are independently a hydrogen atom or a substituted or unsubstituted alkyl group, $R_3$ is a hydrogen atom, a substituted or unsubstituted alkyl group, a substituted or unsubstituted alkoxy group, a substituted or unsubstituted aryloxy group, or a halogen atom, X₁ is a carboxyl group or the salt thereof, or sulfonic acid group or the salt thereof;

n is 1 or 2;

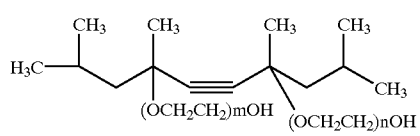
(II)

wherein $4 \leq m+n \leq 20$ where m and n are an integer of 0 or larger.

According to another aspect of the present invention, there is provided an ink jet recording method comprising a step of:

ejecting a magenta ink and a cyan ink from orifices onto a recording medium according to a recording signal so as to overlap each other, on the recording medium, wherein the magenta ink comprises a coloring material of the above general formula (I) and a compound of the above general formula (II), and the cyan ink comprises a coloring material having a copper phthalocyanine structure and a compound of the above general formula (II).

According to another aspect of the present invention, there is provided an ink jet recording apparatus comprising a recording head for ejecting a magenta ink and a cyan ink, wherein the magenta ink comprises a coloring material of the above general formula (I) and a compound of the above general formula (II), and the cyan ink comprises a coloring material having a copper phthalocyanine structure and a compound of the above general formula (II).

According to still other aspects of the present invention, there are provided a recording unit and ink cartridge which use an ink set consisting of a magenta ink and a cyan ink, wherein the magenta ink comprises a coloring material of the above general formula (I) and a compound of the above general formula (II), and the cyan ink comprises a coloring material having a copper phthalocyanine structure and a compound of the above general formula (II).

BRIEF DESCRIPTION OF THE DRAWINGS

FIGS. 14, 15, 16, 17, 18, 19, 20 and 21 are a schematic sectional view of the liquid ejection head taken along X—X in FIG. 13, illustrating the liquid ejection operation of the liquid ejection head with time;

DETAILED DESCRIPTION OF THE PREFERRED EMBODIMENT

Figure 1:
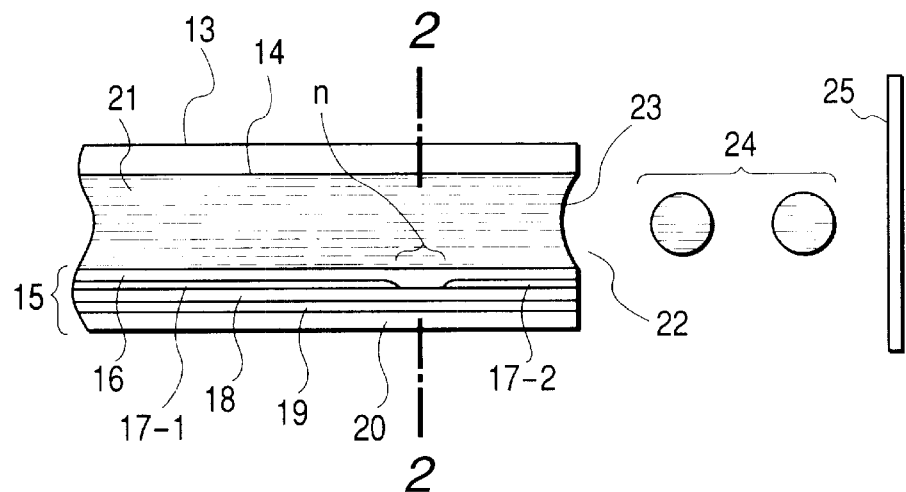
FIG. 1 is a longitudinal section of the head portion of an ink jet recording apparatus.

First, the magenta ink and the cyan ink constituting an ink set of the present invention are described.

The magenta ink used in the present invention is characterized in that it contains a coloring material of the following general formula (I) and an ethylene oxide adduct of acetylene glycol of general formula (II) being a nonionic surfactant as a penetrant.

The coloring material having the following general formula (I) will be described.

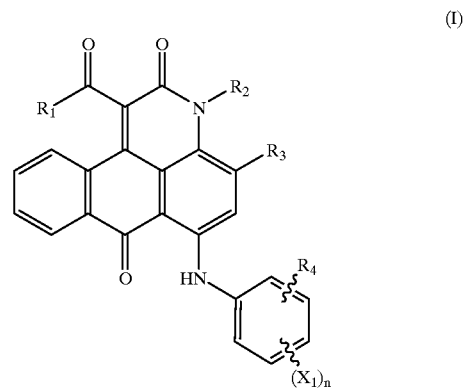
(I)

wherein

R₁ is a substituted or unsubstituted aryl group,

R₂ and R₄ are independently a hydrogen atom, or a substituted or unsubstituted alkyl group, R₃ is a hydrogen atom, a substituted or unsubstituted alkyl group, a substituted or unsubstituted alkoxy group, a substituted or unsubstituted aryloxy group, or a halogen atom, X₁ is a carboxyl group or the salt thereof, or sulfonic acid group or the salt thereof, and n is 1 or 2.

More specifically, $R_1$ of the above general formula includes, for example, a substituted or unsubstituted phenyl group. The substituents of the phenyl group include, for example, methyl group, hydroxyl group, nitro group, sulfonic acid group or the salt thereof, carboxyl group or the salt thereof, and a halogen atom (fluorine, chlorine, bromine, etc.). $R_2$ includes, for example, a hydrogen atom, a straight chain or branched lower alkyl group of 1 to 4 carbon atoms; $R_3$ includes, for example, a hydrogen atom, a straight chain or branched alkyl group of 1 to 4 carbon atoms, a straight chain or branched alkoxy group of 1 to 4 carbon atoms, and an aryloxy group such as a phenoxy group and the like. The aryl group of the aryloxy group may be substituted by, for example, a straight chain or branched alkyl group of 1 to 10 carbon atoms, a sulfonic acid group or a salt thereof, or a carboxyl group or a salt thereof, and the like. $R_4$ includes, for example, a hydrogen atom, or a straight chain-chain or branched-chain lower alkyl group of 1 to 4 carbon atoms. $X_1$ includes, for example, —COOM, —SO$_3$M where M is a hydrogen atom, an alkaline metal such as Li and Na, ammonium (NH$_4$), or an organic ammonium (N(R$_5$)$_4$), and $R_5$ is methyl group or ethyl group or the like.

For further improved fixation of the print on the recording medium, $R_3$ is a substituted aryloxy group. The substituents of aryl group for $R_1$ may be, for example, a straight-chain or branched-chain alkyl or alkoxy group of 1 to 4 carbon atoms, or a halogen atom. An aryl group which constitutes an aryloxy group may be substituted by, for example, a straight chain or branched alkyl group having 1 to 10 carbon atoms, a carboxyl group or a salt thereof, a sulfonic acid group or a salt thereof, or the like.

The specific examples of the coloring material of general formula (I) include Compounds 1 to 7 shown below. However, these compounds are illustrative, not to limit the present invention. Two or more of these coloring materials may be used in the same ink.

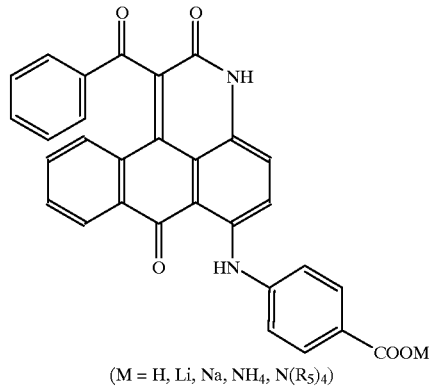

Exemplifying Compound 2

(M = H, Li, Na, NH$_4$, N(R$_5$)$_4$)

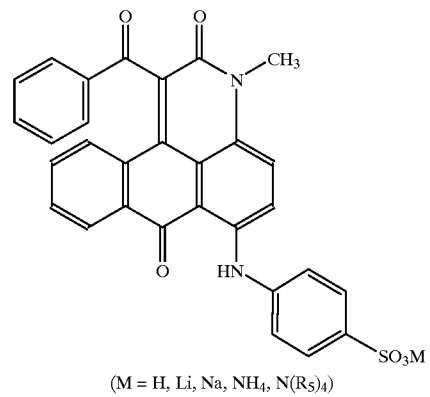

Exemplifying Compound 3

(M = H, Li, Na, NH$_4$, N(R$_5$)$_4$)

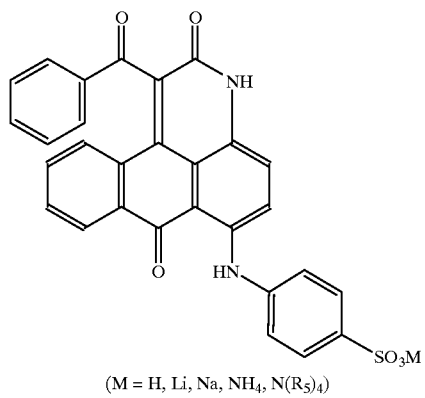

Exemplifying Compound 1

(M = H, Li, Na, NH$_4$, N(R$_5$)$_4$)

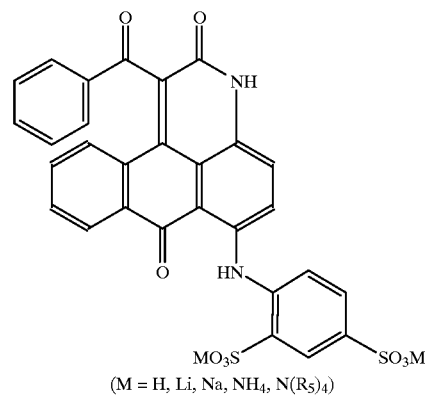

Exemplifying Compound 4

(M = H, Li, Na, NH$_4$, N(R$_5$)$_4$)

Exemplifying Compound 5

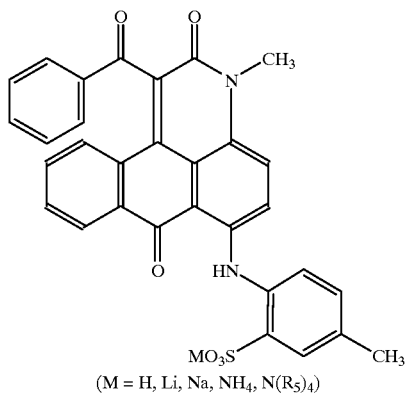

(M = H, Li, Na, NH$_4$, N(R$_5$)$_4$)

Exemplifying Compound 6

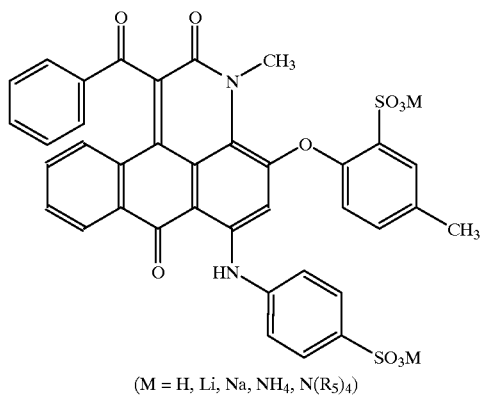

(M = H, Li, Na, NH$_4$, N(R$_5$)$_4$)

Exemplifying Compound 7

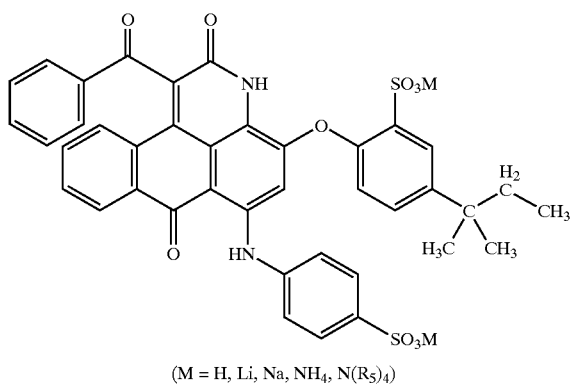

(M = H, Li, Na, NH$_4$, N(R$_5$)$_4$)

In general, the content of the coloring material in the magenta ink described above is preferably in the range of 0.1 to 15.0% by weight, more preferably in the range of 0.5 to 5.0% by weight of the total ink.

Next, the ethylene oxide adduct of acetylene glycol of general formula (II) is explained, which is a nonionic surfactant contained as a penetrant in the magenta ink and the cyan ink according to the present invention;

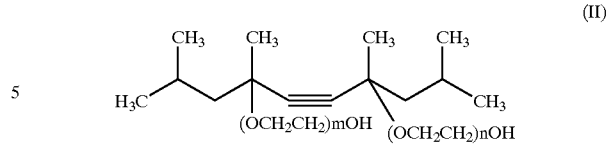

(II)

wherein 4≦m+n≦20 m, n: an integer of 0 or larger.

In view of solubility and effect, m+n is preferably not smaller than 4 and not larger than 20. The content of the penetrant in both inks is preferably in the range of 0.1 to 20% by weight, more preferably in the range of 0.5 to 5% by weight of the ink.

As the cyan ink to be used with the magenta ink in the ink set of the present invention contains a coloring material of copper phthalocyanine structure and a penetrant of the above general formula (II). The cyan coloring materials of copper phthalocyanine structure have excellent tone and weather fastness. The specific examples of the copper phthalocyanine structure coloring material usable in the present invention include, for example, C.I. Acid Blue 249, C.I. Direct Blue 86, C.I. Direct Blue 199 and C.I. Direct Blue 307.

Although the ink set of the present invention is characterized by a combination of the above described magenta ink and cyan ink, it may further contain other inks such as yellow ink and black ink, if necessary.

As for the coloring materials of the yellow ink and the black ink, various dyes and pigments can be used, for example, water-soluble xanthene, triphenylmethane, anthraquinone, monoazo, disazo, trisazo and tetraazo dyes listed in the color index.

For the pigment black ink, suitably used are commercially available carbon blacks such as No. 2300, No. 900, MCF 88, No. 40, No. 52, MA 7, MA 8, No. 2200B (Mitsubishi Chemical Industries Ltd.), RAVEN 1255 (manufactured by Columbia), REGAL 400R, REGAL 660R, MOGUL L (Cabot Co.), Color Black FW1, Color Black FW18, Color Black S170, Color Black S150, Printex 35, Printex U (Degussa).

For the yellow pigment ink, C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83 can be used, for example.

Aqueous Medium

In general, the magenta ink and cyan ink of the ink set of the present invention can be prepared by dissolving or dispersing the above described coloring material in an aqueous medium. The aqueous medium comprises water and/or a water-soluble organic solvent. Any organic solvents can be used so long as they are water-soluble, such as alcohol, polyhydric alcohol, polyglycol, glycol ether, nitrogen-containing polar solvent and sulfur-containing polar solvent. The content of the water-soluble organic solvent is preferably in the range of 1–40%, more preferably 3–30% by weight of the ink, in consideration of moisture maintenance of the ink, solubility of the coloring materials and penetrability of the ink into recording paper. Preferably, the ink contains water in the range of 30–95% by weight in order to maintain high solubility of the dyes, to give suitable viscosity to the ink for steady ink ejection, and to prevent clogging in the nozzle tips.

pH

When the magenta ink used in the present invention contains a coloring material having at least one carboxyl group or-the salt thereof, pH of the ink is preferably neutral to alkaline, in particular, in the range of 7.0 to 11.0, to maintain the solubility of the coloring material in water, to prevent clogging in the nozzle tips, and to ensure long shelf life of the ink. On the other hand, when the coloring material does not have carboxyl group or the salt thereof, pH of the ink may be in the range of 4 to 11.0, since the solubility of the coloring material hardly depends on the pH value.

Additives

In order to maintain the ink moisture, a solid moisturizer such as urea, urea derivatives and trimethylolpropane may be used as an ink component in the present invention, depending on the situation. Generally, the content of the moisturizer in the ink is preferably in the range of 0.1 to 20.0% by weight, more preferably in the range of 3.0 to 10.0% by weight of the ink. In addition, the ink may contain various additives such as pH adjustors, anti-corrosive agents, preservatives, mildewproofing agents, antioxidants, antireductants, evaporation accelerators, chelators and water-soluble polymers, if needed.

Recording Medium

The recording medium used in the present invention is not limited to any specific ones, but those having a coat layer such as glossy paper, coated paper and glossy film are preferably used. For high absorbency, coloring, and resolution, the recording media having a porous particulate layer or a porous polymer layer on the substrate are preferably used.

One example of the recording media used in the present invention has an ink receiving layer comprised of fine particles which form a porous structure, and the particles adsorbed the coloring material such as a dye or pigment in the ink form the image. Such a recording medium is especially preferable for ink jet recording. A type of ink receiving layer, so called absorbing layer that absorbs ink in the voids in the ink receiving layer, is preferable. The absorption-type ink receiving layer comprises a porous layer formed with fine particles as a main component with or without a binder and other additives. The particle materials include, for example, inorganic pigments such as silica, clay, talc, calcium carbonate, kaolin, alumina or aluminum oxide such as hydrated alumina, diatomaceous earth, titanium oxide, hydrotalcite, and zinc oxide; and organic pigments such as urea-formalin resin, ethylene resin, and styrene resin. At least one of these materials can be used. As the binder, for example, water-soluble polymer and latex can be used. Examples of such binders include poly(vinyl alcohol) or modified poly(vinyl alcohol); starch or modified starch; gelatin or modified gelatin; gum arabic; cellulose derivatives such as carboxymethyl cellulose, hydroxyethyl cellulose, and hydroxyproylmethyl cellulose; SBR latex; NBR latex; methylmethacrylate-butadiene copolymer latex; functional-group-modified polymer latex; vinyl copolymer latex such as ethylene-vinyl acetate copolymer; polyvinyl pyrrolidone; maleic anhydride or the copolymer thereof; and acrylate ester copolymer. If necessary, two or more binders can be used in combination. Other additives, such as dispersant, thickening agent, pH adjustor, lubricant, flow modifier, surfactant, antifoaming agent, fluorescent brightener, ultraviolet absorber and antioxidant, can also be used depending on the situation. Preferable ink receiving layer of the recording medium mainly comprises particles of average diameter 1 μm or smaller, and particularly preferably particles of silica and aluminum oxide of this size. The preferable silica particles are those exemplified by colloidal silica. Although colloidal silica is commercially available, particularly preferable colloidal silica is those described in, for example, Japanese Patent Publication No. 2803134 and Japanese Patent Publication No. 2881847. The preferable aluminum oxide particles include, for example, hydrated alumina particles. One suitable example of alumina pigments is hydrated alumina represented by the following formula (VI):

$$Al_2O_{3-n}(OH)_{2n} \cdot mH_2O \qquad (VI)$$

wherein n is an integer of 1, 2 and 3, m is a value between 0 and 10, preferably 0 and 5, and m+n is not 0. In most cases, $mH_2O$ represents the eliminable water not participating in the formation of $mH_2O$ crystal lattice; accordingly, m can be an integer or a value other than integers. Further, m may become 0 by heating this type of material.

Preferable hydrated alumina can be manufactured by the known methods as disclosed in U.S. Pat. No. 4,242,271 and U.S. Pat. No. 4,202,870 wherein aluminum alkoxide or sodium aluminate is hydrolyzed, or as disclosed in Japanese Patent Publication No. 57-44605 wherein an aqueous solution of sodium aluminate is neutralized by adding an aqueous solution of sodium sulfate, or of aluminum chloride.

Figure 22:
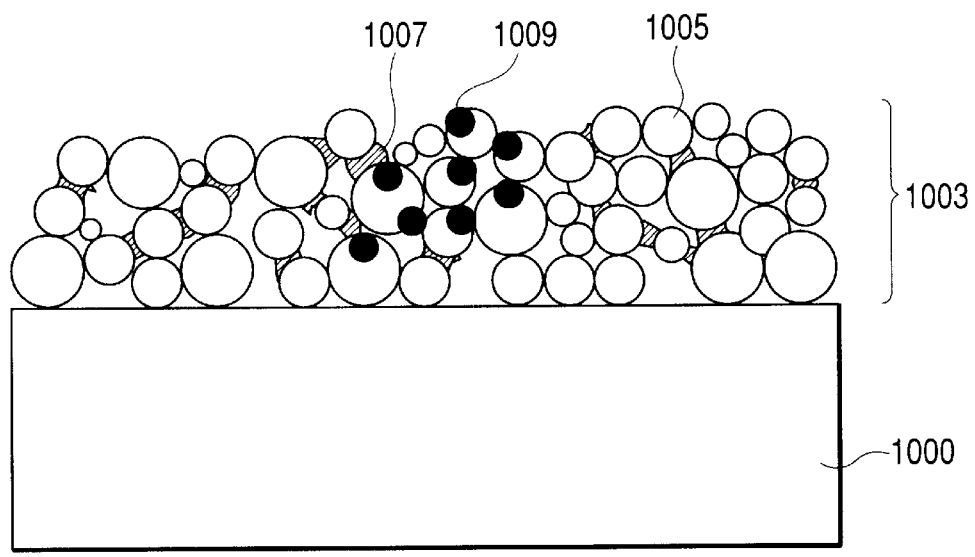
FIG. 22 is a schematic sectional view of a recording medium used in the present invention.
Figure 23:
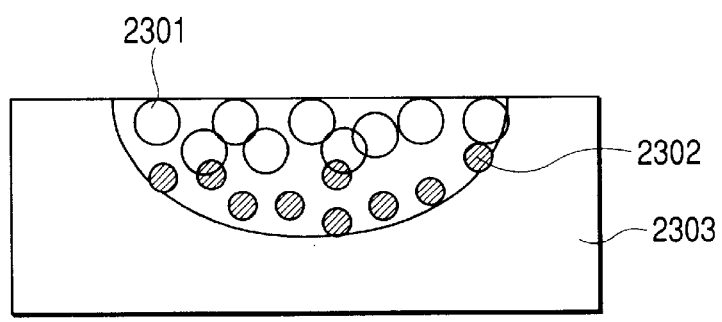
FIG. 23 is a schematic sectional view of a color mixing portion of magenta ink and cyan ink of an ink set according to the present invention.
Figure 24:
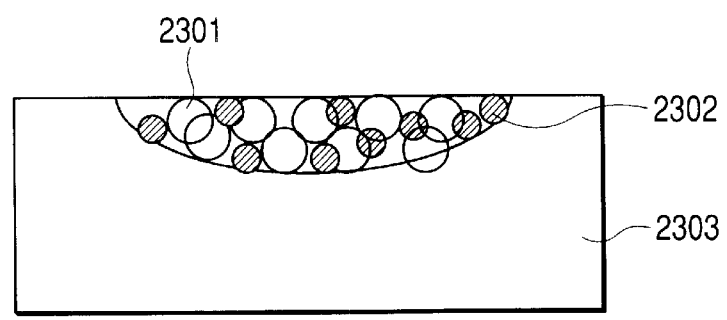
FIG. 24 is a schematic sectional view of a color mixing portion of conventional magenta ink and cyan ink both of low penetrability.

FIG. 22 is a schematic section of a so-called coated paper having an ink receiving layer on the substrate. In FIG. 22, the reference numeral 1000 denotes a substrate, 1003 denotes a coating layer (the ink receiving layer) held on the substrate 1000. The coating layer 1003 is a porous layer containing fine particles 1005 fixed with a binder 1007. When an ink droplet is applied onto such a coat paper, the coloring material 1009 in the ink is adsorbed on the surface of the fine particles 1005, and the adsorbed coloring material forms an image.

The ink set of the present invention is suitably used particularly in an ink jet recording system which produces records by ejecting liquid droplets by applying thermal energy to the liquid, but it goes without saying that the ink set of the present invention can be used in other ink jet recording systems. In addition, it can be used as a writing implement.

Recording Apparatus, Ink Cartridge, Recording Unit

The recording apparatus suitable for recording with the magenta ink and the cyan ink according to the present invention include, for example, an apparatus which forms and ejects an ink droplet by applying thermal energy to the ink in accordance with recording signals.

Figure 2:
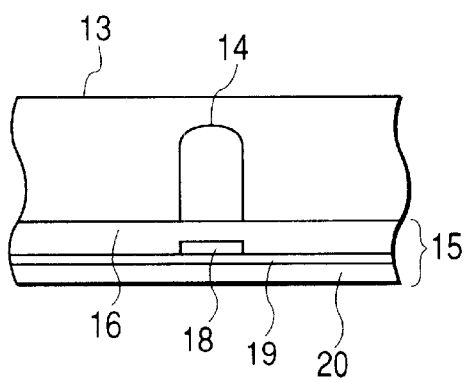
FIG. 2 is a transverse cross-section of the head portion of an ink jet recording apparatus.
Figure 3:
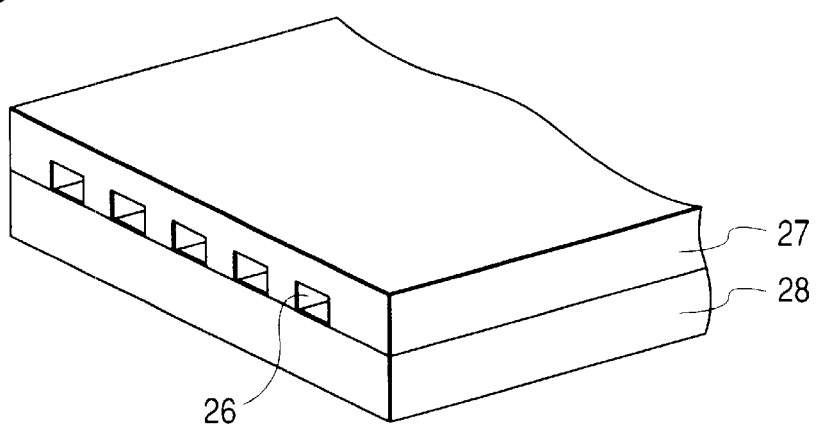
FIG. 3 is a perspective view of the head portion of an ink jet recording apparatus.

First, a configuration example of the main part, head, of this apparatus is shown in FIGS. 1, 2 and 3. FIG. 1 is a sectional view of a head 13 along the ink flow path and FIG. 2 is a sectional view taken on line 2—2 of FIG. 1. The head 13 is obtained by adhesion of a heat generating head 15 used for the thermosensitive recording (in FIG. 1, a film head is shown, but the present invention is not limited to this) to a glass, ceramic or plastic plate having a groove 14 through which ink flows. The heat generating head 15 comprises a protective film 16 formed of silicon oxide or the like, aluminum electrodes 17-1 and 17-2, a heat generating resistance layer 18 formed of Nichrome, a heat accumulating layer 19 and a highly heat-radiating substrate 20 made of alumina or the like.

The ink 21 comes to a discharge orifice (fine hole) 22 and forms a meniscus 23 under the pressure P.

Figure 4:
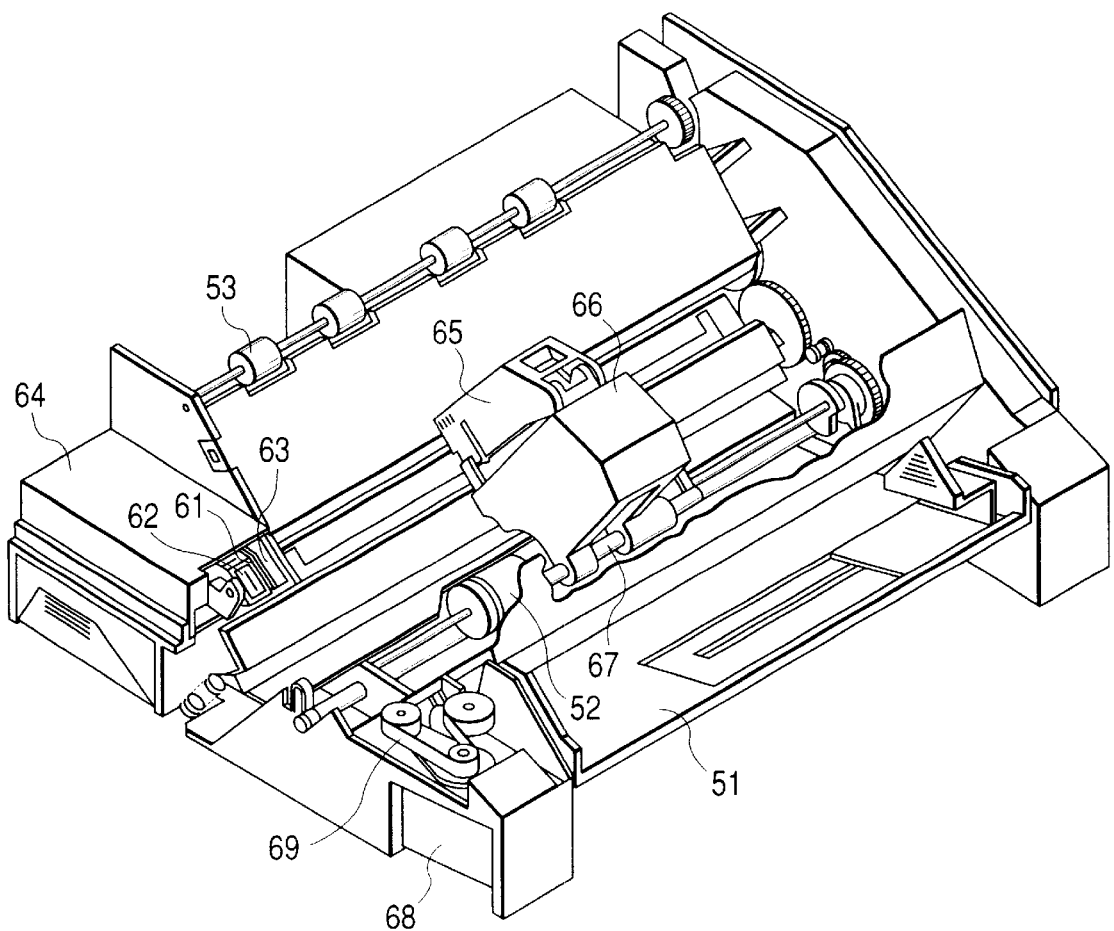
FIG. 4 is a perspective view of an ink jet recording apparatus.

FIG. 4 shows one example of ink-jet recording apparatus with the above head incorporated. In FIG. 4, numeral 61 denotes a blade serving as the wiping member, one end of which is retained by a blade retaining member to make a stationary end, thereby shaping a cantilever as a whole. The blade 61 is disposed at a position adjacent to the recording area by the recording head and is retained in the shape of protruding into the moving route of the recording head in case of this example. Numeral 62 denotes a cap on the ejection orifice surface of the recording head, which is located at the home position adjacent to the blade 61 and so arranged as to move in a direction perpendicular to the movement of the recording head, to butt against the ink ejection orifice and to fulfill the capping. Furthermore, Numeral 63 denotes an ink absorber provided adjacently to the blade 61, which is retained in the shape of protruding into the moving route of the recording head as with the blade 61.

A discharge recovering section 64 comprises the above blade 61, the above cap 62 and the above ink absorber 63 and the moisture, dust and the like on the ink ejection orifice are removed by the blade 61 and the ink absorber 63.

Numerals 65 and 66 denotes a recording head equipped with discharge energy generating means which discharges ink to the recording medium opposed to the ejection orifice face from a ejection orifice disposed to perform recording and an carriage for loading and moving the recording head 65, respectively. The carriage 66 is slidably engaged with a guide shaft 67 and part of the carriage 66 is connected (unillustrated) to the belt 69 driven by a motor 68. Thereby, the carriage 66 is enabled to move along the guide shaft 67, thus enabling the recording area by the recording head 65 and its adjacent areas to move.

Numerals 51 and 52 denote a paper feed section for inserting a recording medium and a paper feed roller driven by an unillustrated motor, respectively. By these constituents, the recording medium is fed to the position opposed to the ejection orifice face of the recording head 65 and paper is discharged to the paper discharge section disposed with the paper discharge roller 53 according to the progress of recording.

In a return of the recording head 65 to the home position at the end of recording or the like with the above configuration, the cap 62 of the discharge recovering section 64 is averted from the moving route of the recording head 65, whereas the blade 61 protrudes into the moving route. As a result, the ejection orifice face of the recording head 65 is wiped. When the cap 62 caps the ejection orifice face of the recording head 65 by butting, the cap 62 moves in such a manner as to protrude into the moving route of the recording head.

When the recording head 65 moves from the home position to the recording start position, the cap 62 and the blade 61 stand at the same position as that of the above wiping. As a result, the ejection orifice face of the recording head 65 is wiped also in this move. The above move of the recording head 65 to the home position is not only performed at the completion of recording and at the recovery of discharge, but also the recording head 65 moves at given intervals to the home position adjacent to the recording area while moving through the recording area for recording and the above wiping is carried out with this move.

Figure 5:
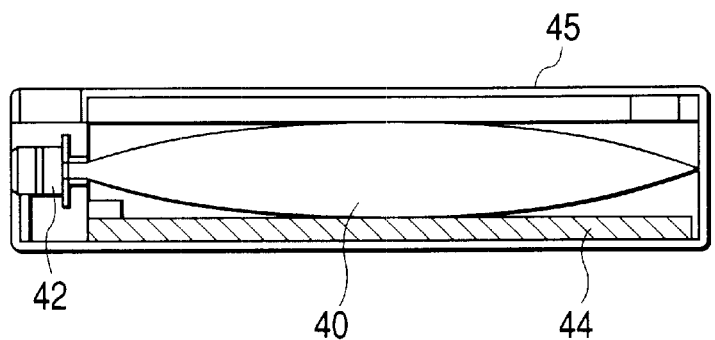
FIG. 5 is a longitudinal section of an ink cartridge.

FIG. 5 shows one example of an ink supply member for the head, an ink cartridge 45 for storing the ink supplied via a tube. Here, numeral 40 denotes an ink storing section for storing the supply ink, e.g. an ink bag, at the tip of which a rubber stopper 42 is provided. By inserting a needle (unillustrated) into this stopper 42, the ink in the ink sack 40 is enabled to be supplied to the head. Numeral 44 denotes an ink absorber for receiving the waste ink.

Figure 6:
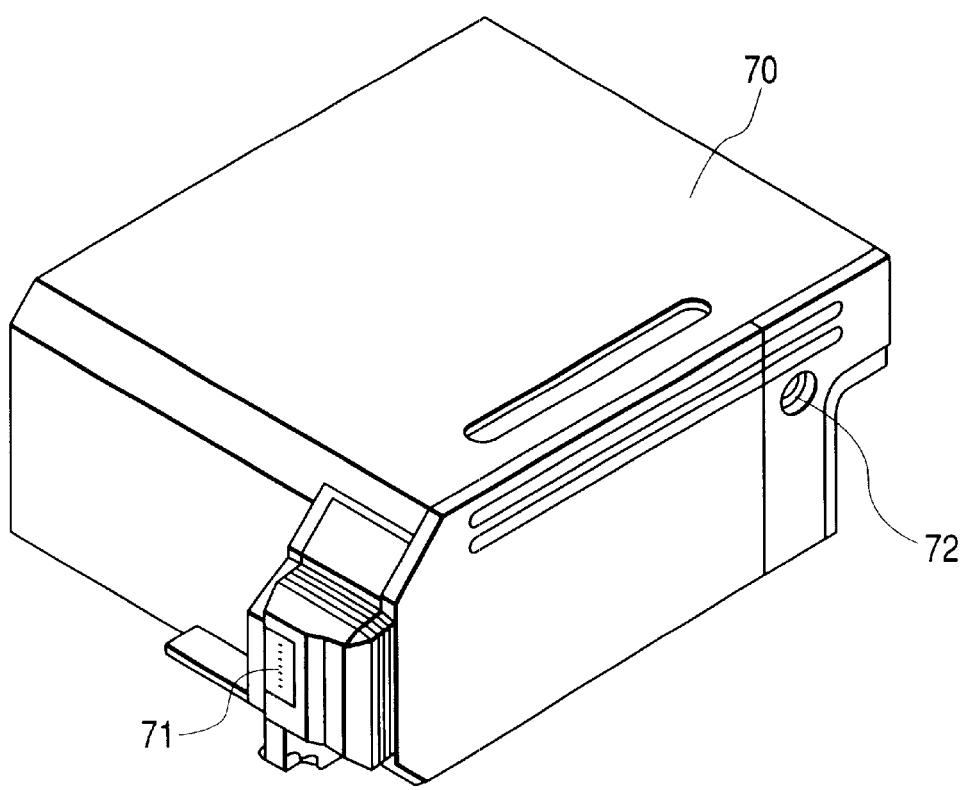
FIG. 6 is a perspective view of a recording unit.

An ink-jet recording apparatus according to the present invention is not limited to those comprising a head and an ink cartridge separately as mentioned above, but is also appropriately applied to integrated one as shown in FIG. 6.

In FIG. 6, numeral 70 denotes a recording unit in which an ink store section for storing ink, e.g. an ink absorber is accommodated and the ink in such an ink absorber is discharged as an ink droplet from the head section 71 having a plurality of orifices. Numeral 72 denotes an atmosphere communicative port for communicating the recording unit interior to the atmosphere. This recording unit 70 is used in place of the recording head 65 shown in FIG. 4 and is freely mountable and demountable.

In the recording apparatus and recording head of the invention, the magenta ink and the cyan ink constituting the ink set of the invention are stored in ink storing portions or ink cartridges.

Next, another particular example of a recording apparatus and a recording head that can suitably be used in the present invention will be described.

Figure 7:
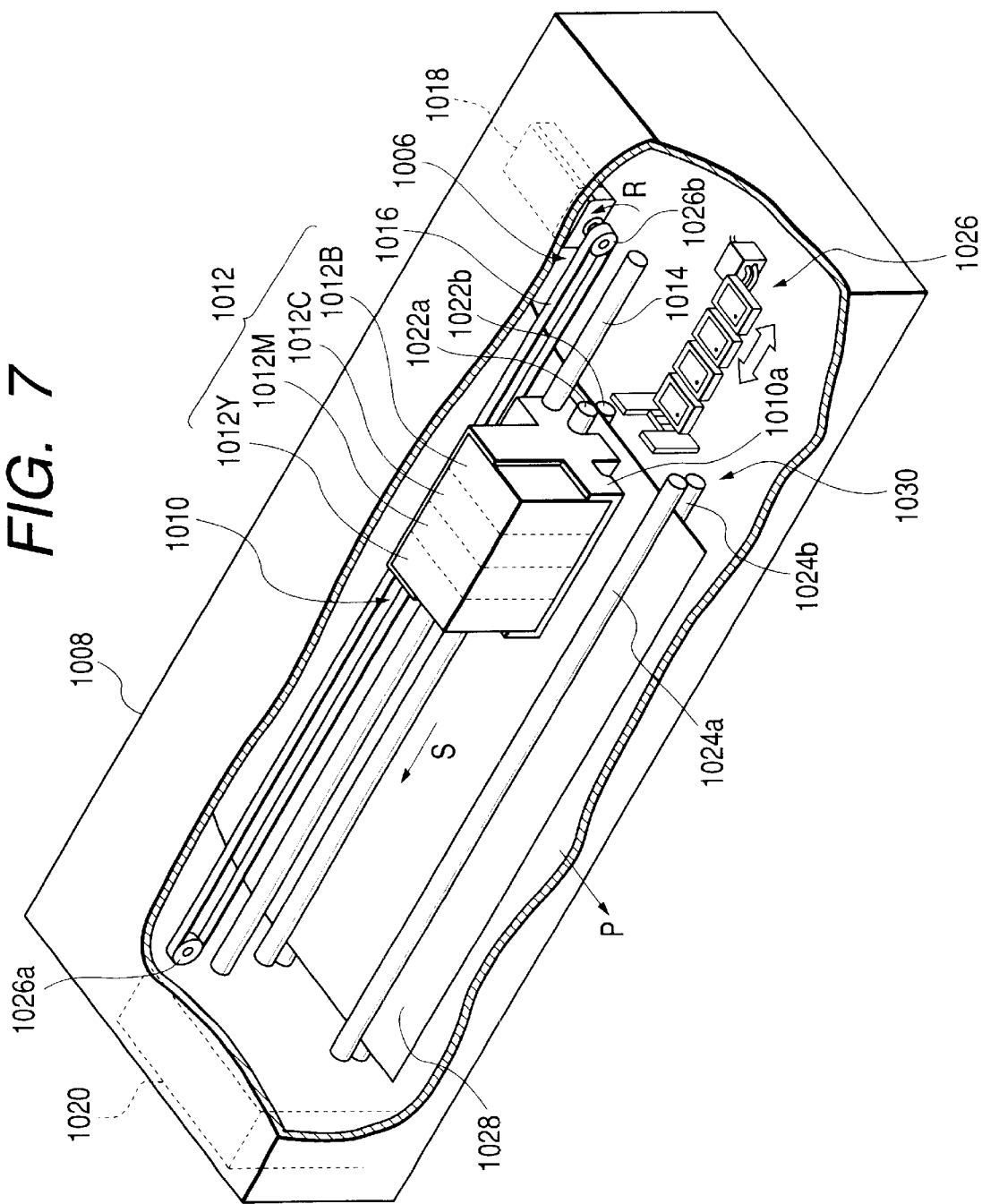
FIG. 7 is a schematic perspective of the main part of an ink jet printer capable of mounting a liquid ejection head thereon.

FIG. 7 schematically shows the main section of one example of a liquid ejection head as an ejection type liquid ejection head in which the bubble communicates with the atmosphere at the time of discharge and an ink jet printer as a liquid discharge apparatus using this head according to the present invention. In FIG. 7, the ink jet printer is configured to comprise a feeder device 1030 that intermittently feeds a sheet of paper 1028 as a recording medium provided along the longitudinal direction in a casing 1008 in the direction shown by arrow P shown in FIG. 7, a recording section 1010 that is reciprocated approximately in parallel to the direction S approximately at right angles to the feeding direction P of the paper 1028 by the feeder device 1030, and a movement driving section 1006 as driving means for reciprocating the recording section 1010.

The feeder device 1030 comprises a roller unit 1022a and 1022b and a roller unit 1024a and 1024b are allocated approximately in parallel, and a driving portion 1020 for driving these roller units. With such a constitution, when the driving portion 1020 of the feeder device 1030 is operated, the paper 1028 is conveyed intermittently in the direction P as shown in FIG. 7, nipped between the roller units 1022a and 1022b, and 1024a and 1024b.

The movement driving section 1006 comprises a belt 1016 that is wound on pulleys 1026a, 1026b provided on rotary shafts oppositely arranged with a predetermined interval, and a motor 1018 that drives the belt 1016 arranged approximately in parallel to roller units 1022a, 1022b and connected to a carriage member 1010a of the recording section 1010 in the forward direction and reverse direction.

When the motor 1018 is brought in the operating state and the belt 1016 is rotated in the direction shown by arrow R in FIG. 7, the carriage member 1010a of the recording section 1010 is moved in the direction shown by arrow S in FIG. 7 only by a predetermined movement. Furthermore, when the motor 1018 is brought in the operating state and the belt 1016 is rotated in the direction opposite to the direction shown by arrow R in FIG. 7, the carriage member 1010a of the recording section 1010 is moved in the direction opposite to the direction shown by arrow S in FIG. 7 only by a predetermined movement. Furthermore, to one end of the movement driving section 1006, at a position which is a home position of the carriage member 1010a, a recovery unit 1026 for performing the ejection recovery process of the recording section 1010 is provided opposite to the arrangement of the ink ejection orifice of the recording section 1010.

In the recording section 1010, ink jet cartridges (hereafter, in some cases, referred to simply as cartridges) 1012Y, 1012M, 1012C, 1012 B are detachably provided to the carriage member 1010a for each color, for example, for each of yellow, magenta, cyanogen, and black.

Figure 8:
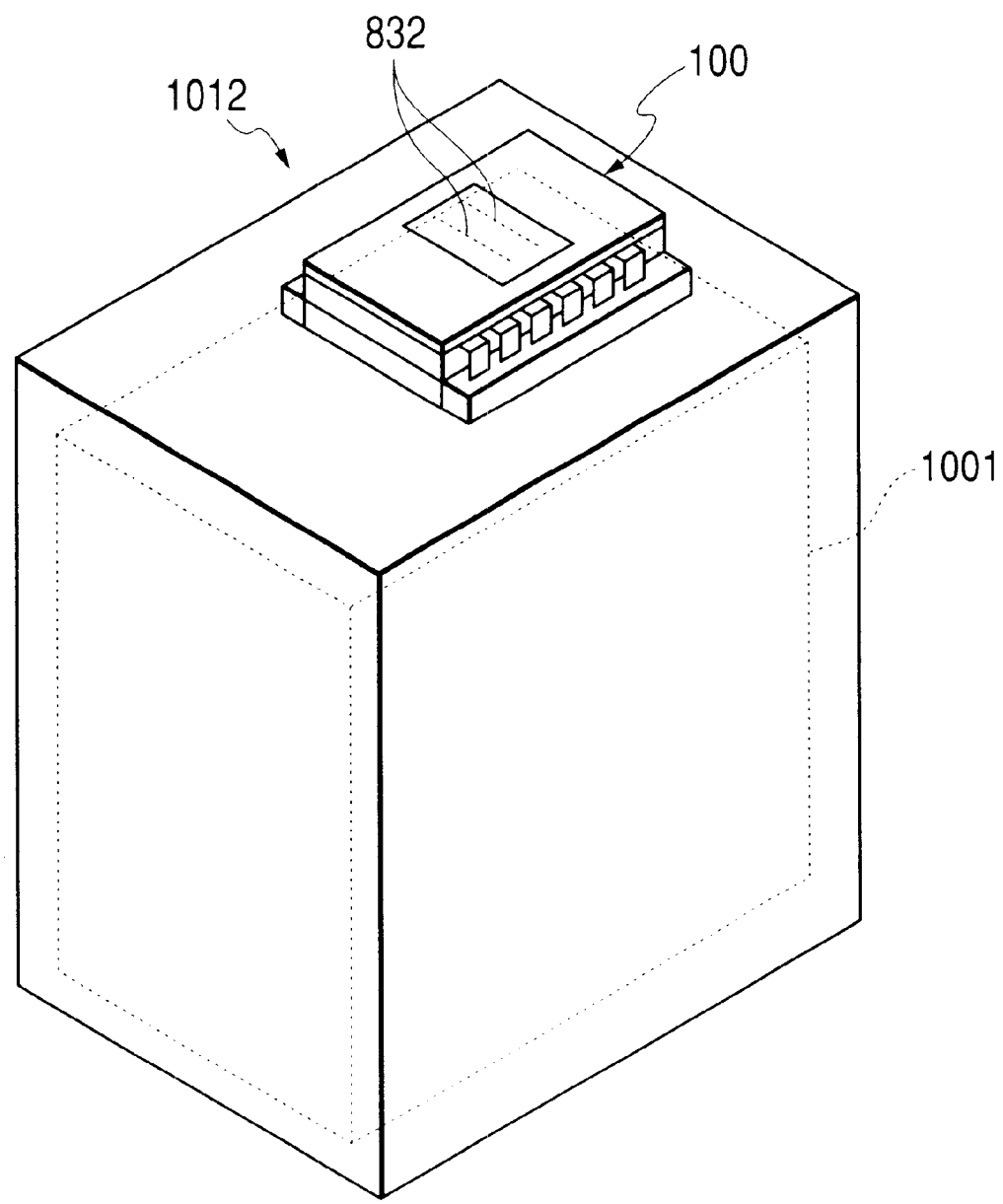
FIG. 8 is a schematic perspective view of an ink jet cartridge with an ejection head.

FIG. 8 shows one example of an ink jet cartridge that can be mounted on the above described ink jet recording apparatus. The cartridge 1012 in this example is a serial type cartridge, and the main section consists of an ink jet recording head 100 and a liquid tank 1001 for containing liquid such as ink. In the ink jet recording head 100, a number of ejection orifices 832 for discharging the liquid are formed, and the liquid such as ink is arranged to be introduced to a common liquid chamber (see FIG. 9) of the liquid ejection head 1100 through a liquid supply path not shown from a liquid tank 1001. The cartridge 1012 shown in FIG. 8 is a cartridge in which the ink jet recording head 100 and the liquid tank 1001 are integrally formed so that liquid may be supplied into the liquid tank 1001 if necessary, but it is also possible to adopt a structure where the liquid tank 1001 is exchangeably connected to this liquid ejection head 1100.

A particular example of the above described liquid ejection head that can be mounted on an ink jet printer with such a configuration will be described below in more detail.

Figure 9:
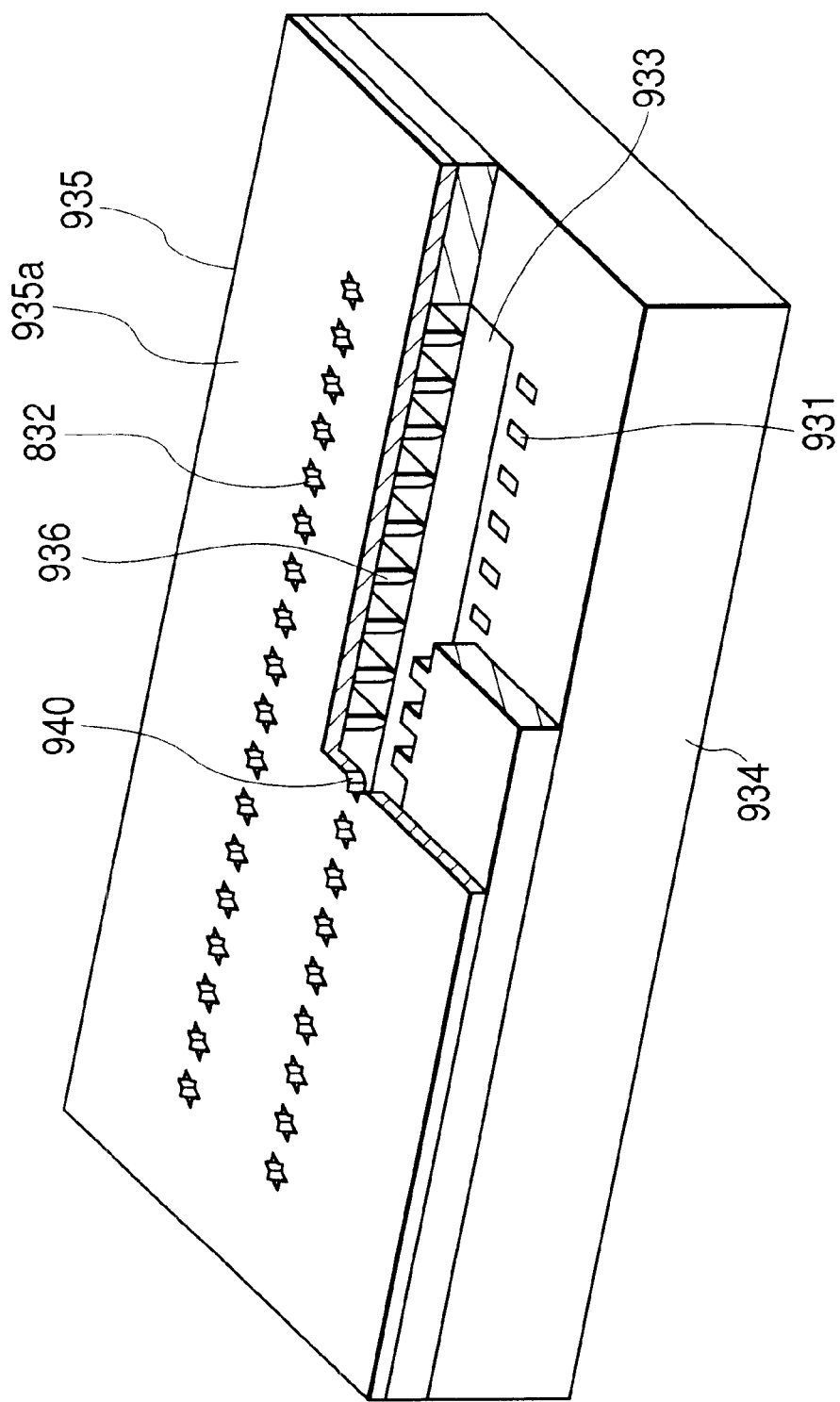
FIG. 9 is a schematic partly-open up view of the main part of an ejection head.

FIG. 9 is a perspective view schematically showing the main section of a liquid ejection head showing the basic form of the present invention, and FIG. 10 to FIG. 13 are front views showing the shape of the ejection orifice of a liquid ejection head shown in FIG. 9. Herein, the electrical wiring or the like for driving the electrothermal converting element is omitted.

In the liquid ejection head of this example, for example, as shown in FIG. 9, a substrate 934 made of glass, ceramics, plastic, or metal or the like is used. The material of such a substrate is not important for the present invention, and it is not specifically limited as long as it can function as part of the flow path component and it can function as a support member of the material layer forming the ink ejection energy generating element, and the liquid flow path and ejection orifice to be described later. Accordingly, in this example, a case where an Si substrate (wafer) is used will be described. Besides a forming method by using laser beams, the ejection orifice can also be formed by a method in which for example, an orifice plate (ejection orifice plate) 935 to be described later is made of photosensitive plastics so that an exposure device such as MPA (Mirror Projection Aliner) may be used.

In FIG. 9, reference numeral 934 denotes a substrate having an electrothermal converting element (hereafter, in some cases, referred to as a heater) 931 and an ink supply port 933 made of an elongated groove-shaped through hole as a common liquid chamber section, and on both sides in the longitudinal direction of the ink supply port 933, one line of heaters 931 that are thermal energy generating means are arranged in a staggered arrangement, for example, at intervals of 300 dpi between the electrothermal converting elements, respectively. On this substrate 934, ink flow path walls 936 for forming ink flow paths are provided. Furthermore, to these ink flow path walls 936, an ejection orifice plate 935 having ejection orifices 832 is provided.

Here, in FIG. 9, the ink flow path wall 936 and the ejection orifice plate 935 are shown as separate members, but it is also possible to simultaneously form the ink flow path wall 936 and the ejection orifice plate 935 as one member by forming this ink flow path wall 936 on the substrate 934 by a method such as the spin coating. In this example, furthermore, the water repellency treatment is performed on the ejection orifice surface (upper surface) 935a side.

Figure 10:
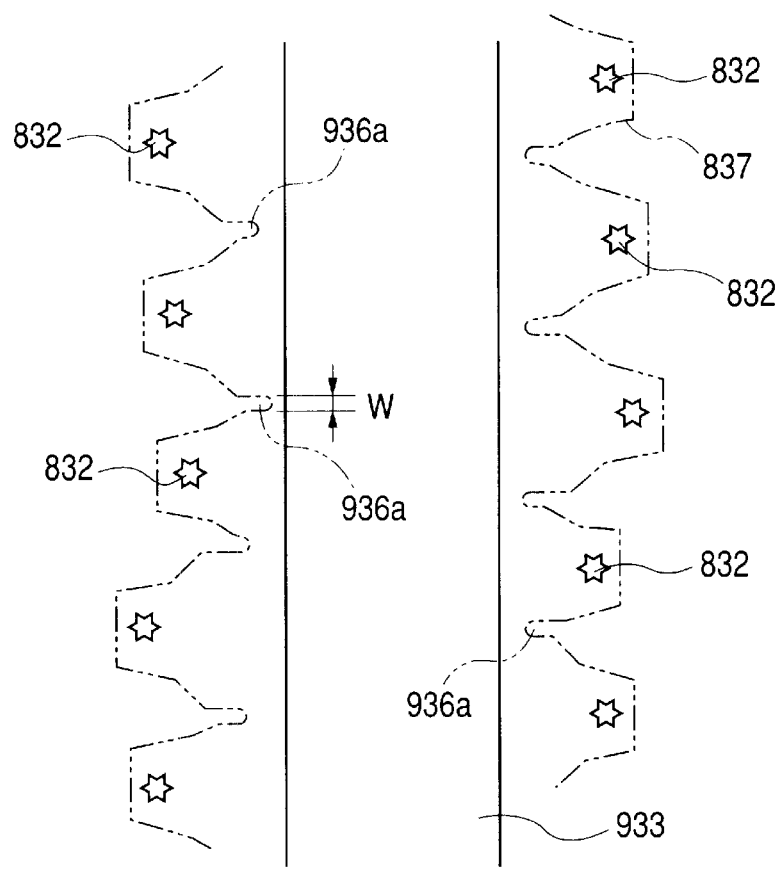
FIG. 10 is a conceptional view of a part of an ejection head.
Figure 13:
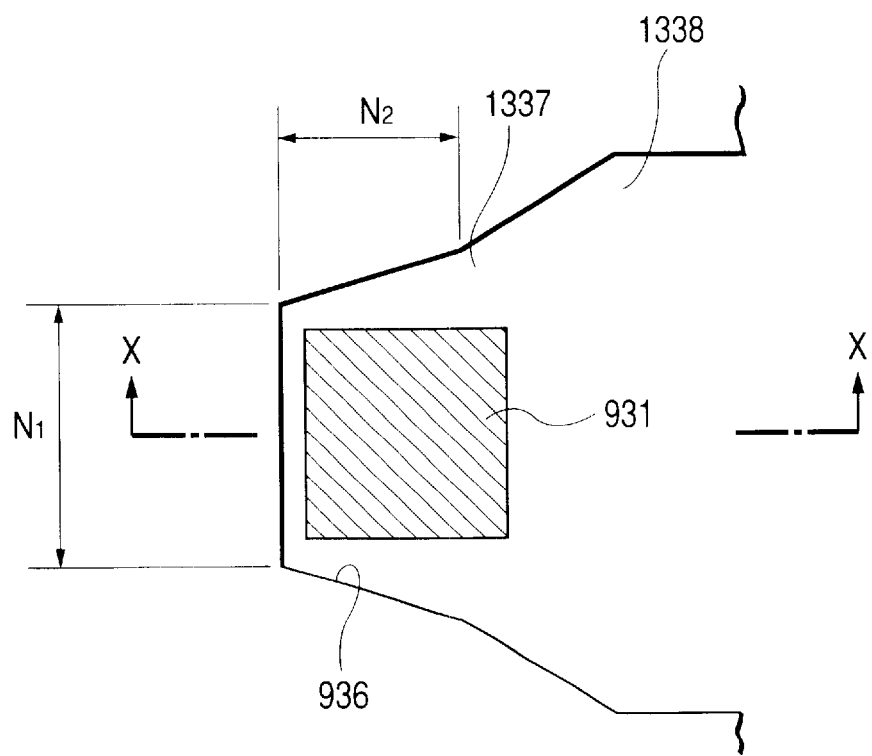
FIG. 13 is a schematic view of the main part of the liquid ejection head shown in FIG. 10.

In this example, a serial type head that performs recording while scanning in the direction shown by arrow S in FIG. 7 is used, and the recording is performed, for example, by 1200 dpi. The driving frequency is 10 kHz, and at one ejection orifice, the discharge is performed at the shortest time intervals of 100 $\mu$s. Furthermore, as one example of actual size of the head, for example, as shown in FIG. 10, a partition wall 936a that hydraulically separates adjacent nozzles has a width W of 14 $\mu$m. As shown in FIG. 13, a bubbling chamber 1337 formed by the ink flow path wall 936 has $N_1$ (width size of a bubbling chamber) of 33 $\mu$m and $N_2$ (length size of a bubbling chamber) of 35 $\mu$m. The size of a heater 931 is 30 $\mu$m×30 $\mu$m, and the resistance of a heater is 53 $\Omega$, and the driving voltage is 10.3 V. Furthermore, the height of an ink flow path wall 936 and a partition wall 936a is 12 $\mu$m, and an ejection orifice plate with a thickness of 11 $\mu$m can be used.

Figure 11:
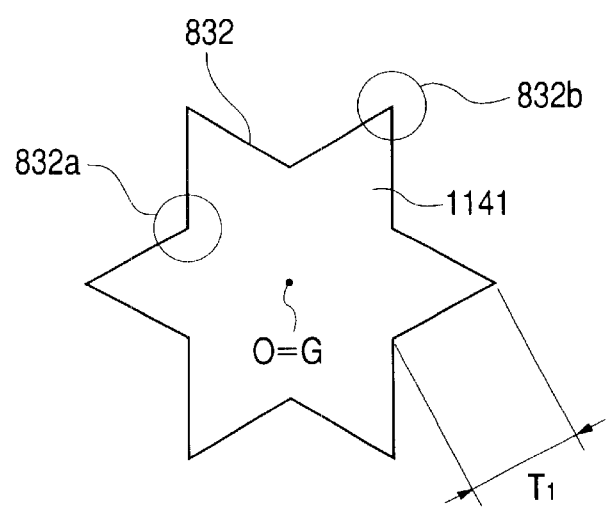
FIG. 11 is an enlarged view of the ejection port shown in FIG. 10.

Among the cross sections of the ejection orifice section 940 shown in FIG. 9 provided in the ejection orifice plate including the ejection orifice 832, the cross section taken in the direction crossing the discharge direction of the ink (thickness direction of the orifice plate 935) is shaped roughly like a star as shown in FIG. 11, and it is roughly configured by six rising sections 832a having an obtuse angle and six recessed sections 832b arranged alternately between these rising sections 832a and having an acute angle. That is, six grooves are formed in the thickness direction of the orifice plate of FIG. 9 (discharge direction of the liquid) with the recessed section 832b as an area locally separated from the center O of the ejection orifice being the top thereof and the rising section 832a as an area locally near the center O of the ejection orifice adjacent to this area being the base thereof (see FIG. 11).

Figure 12:
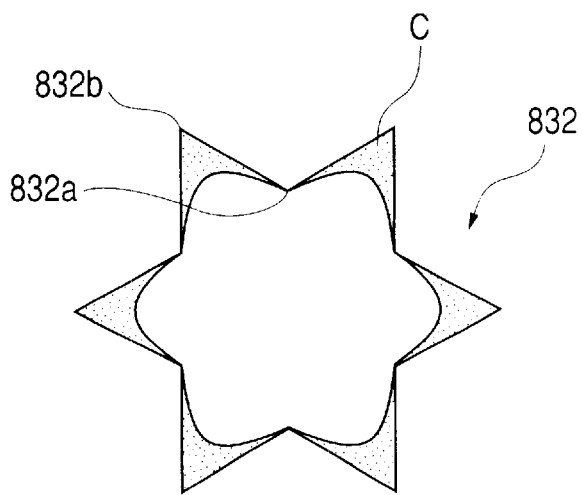
FIG. 12 schematically shows the ink deposition state of the ejection port portion shown in FIG. 11.

In this example, the ejection orifice section 940 is made such that for example, the cross section fallen in the direction crossing the thickness direction thereof has a shape of two equilateral triangles with a side of 27 $\mu$m combined rotated by 60 degrees to each other, and $T_1$ shown in FIG. 11 is 8 $\mu$m. Every angle of the rising section 832a is 120 degrees, and every angle of the recessed section 832b is 60 degrees. Accordingly, it is arranged that the center O of the ejection orifice agrees with the center G of gravity of a polygon formed by connecting central sections (centers (centers of gravity) of the figure formed by connecting the top of the groove and two bases adjacent to this top) of mutually adjacent grooves. The opening area of an ejection orifice 832 of this example is 400 $\mu$m$^2$, and the opening area of the groove section (area of a figure made by connecting the top of the groove and two bases adjacent to this top) is about 33 $\mu$m$^2$ per one. FIG. 12 is a schematic view showing the state where ink is applied to the part of the ejection orifice shown in FIG. 11.

Figure 14:
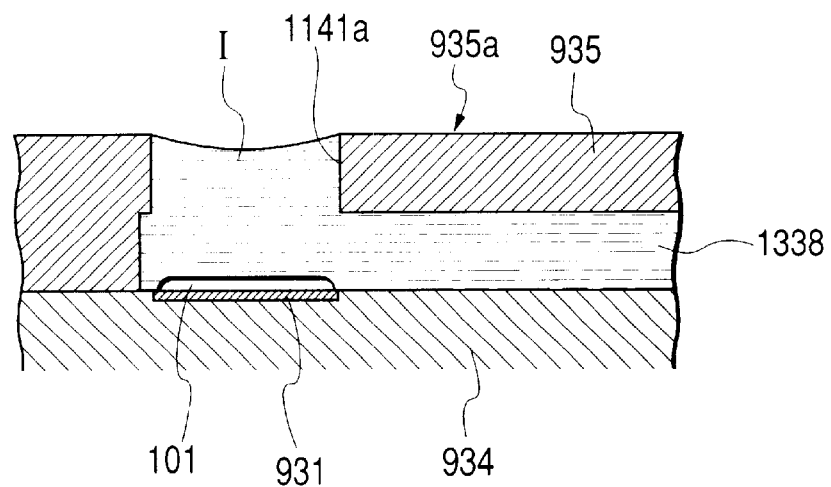
Figure 15:
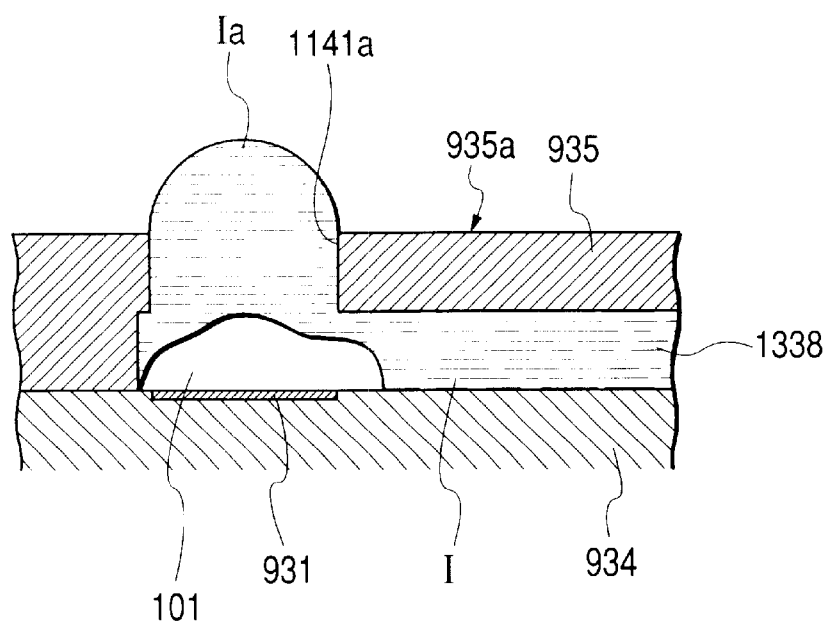
Figure 16:
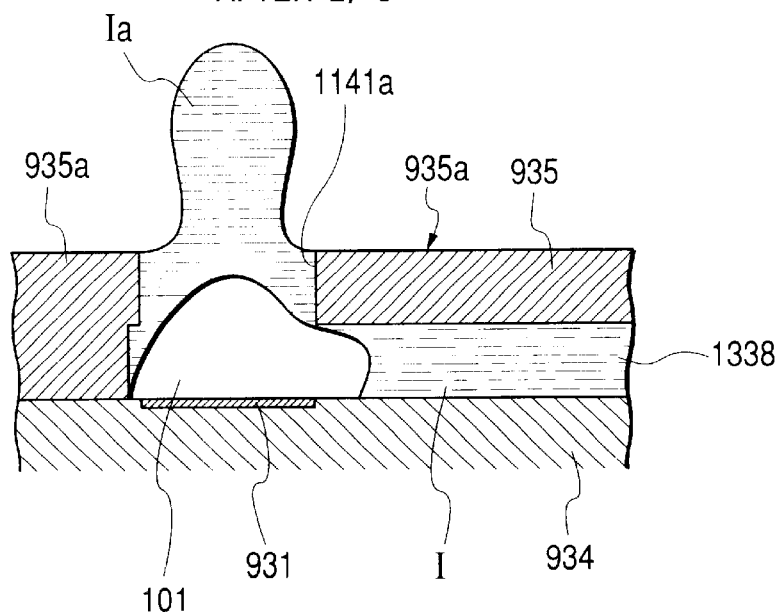
Figure 17:
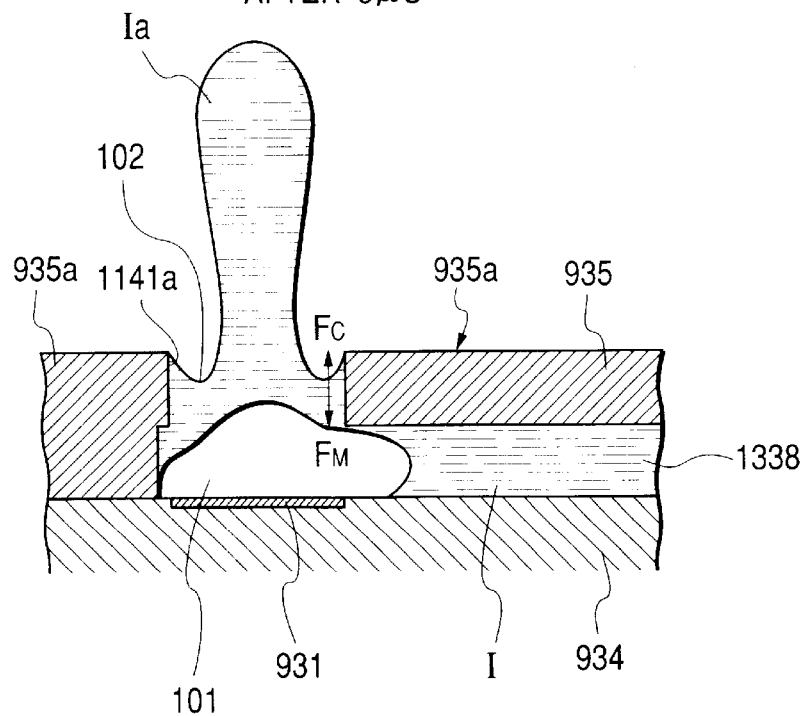
Figure 20:
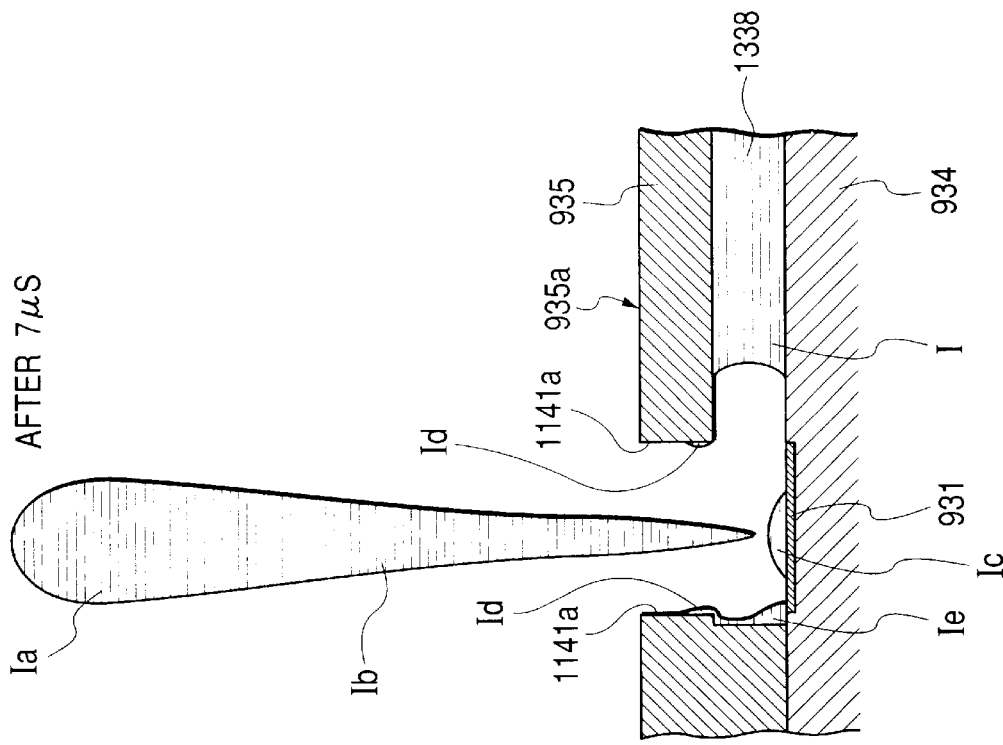
Figure 21:
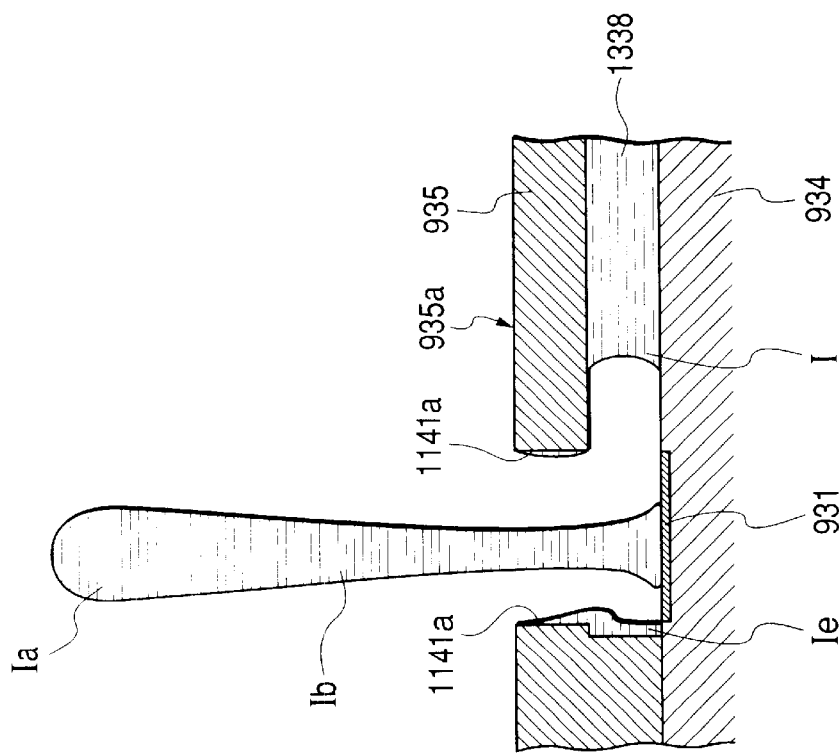

Next, the discharging action of liquid by an ink jet recording head with the above described configuration will be described by using FIG. 14 to FIG. 21. FIG. 14 to FIG. 21 are cross sectional views for explaining the liquid discharging action of a liquid ejection head described in FIG. 9 to FIG. 13, and are cross sectional views taken along X—X of a bubbling chamber 1337 shown in FIG. 13. In this cross section, the end in the thickness direction of the orifice plate of the ejection orifice 940 is the top 1141a of the groove 1141. FIG. 14 shows a state where a film-like bubble is formed on the heater, and FIGS. 15 to 21 show the subsequent state of the bubble. FIG. 15 shows a state about 1 $\mu$s after the state of FIG. 14, and FIG. 16 shows a state about 2 $\mu$s after the state of FIG. 14, and FIG. 17 shows a state about 3 $\mu$s after the state of FIG. 14, and FIG. 18 shows a state about 4 $\mu$s after the state of FIG. 14, and FIG. 19 shows a state about 5 $\mu$s after the state of FIG. 14, and FIG. 20 shows a state about 6 $\mu$s after the state of FIG. 14, and FIG. 21 shows a state about 7 $\mu$s after the state of FIG. 14. Herein, in the following description, dropping does not mean the falling in the so-called direction toward gravity, but it means the movement in the direction toward an electrothermal converting element regardless of the attaching direction of a head.

First, as shown in FIG. 14, when a bubble 101 is formed in the liquid flow path 1338 on the heater 931 on supplying electric current to the heater 931 according to a recording signal or the like, the volume thereof is suddenly expanded within about 2 μs as shown in FIG. 15 and FIG. 16, so that the bubble may grow. The height of the bubble 101 at the time of the maximum volume exceeds the ejection orifice surface 935a, but at this moment, the pressure of a bubble is decreased to about one half to one-nineteenth of the atmospheric pressure.

Next, at the time about 2 μs after the formation of a bubble 101, the bubble 101 begins to decrease the volume from the maximum volume as mentioned above, and approximately simultaneously with this, the formation of a meniscus 102 also begins. This meniscus 102 also retreats in the direction on the heater 931 side, that is, falls as shown in FIG. 17. Here, in this example, there are a plurality of grooves 1141 scattered at the ejection orifice section, and therefore, when the meniscus 102 retreats, the capillary force acts in the opposite direction $F_C$ of the meniscus retreating direction $F_M$ at the part of the groove 1141. As a result of that, even if a little scattering is recognized in the state of the bubble 101 because of any reason, the shapes of the meniscus when retreating and the main liquid droplet (hereafter, in some cases, referred to as liquid or ink) Ia are modified to be approximately symmetrical shapes with respect to the center of the ejection orifice.

Then, in this example, the falling speed of this meniscus 102 is faster than the contracting speed of the bubble 101, and therefore, as shown in FIG. 18, the bubble 101 communicates with the atmosphere at a place near the under surface of the ejection orifice 832 at the time about 4 μs after the formation of the bubble. At this moment, the liquid (ink) near the central axis of the ejection orifice 832 falls down toward the heater 931. This is caused since the liquid (ink) Ia drawn back to the heater 931 side by the negative pressure of the bubble 101 before communicating with the atmosphere keeps the speed in the direction of the surface of the heater 931 due to the inertia after the bubble 101 has communicated with the atmosphere. The liquid (ink) that has fallen down toward the heater 931 side reaches the surface of the heater 931 at the time about 5 μs after the formation of the bubble 101 as shown in FIG. 19, and as shown in FIG. 20, it spreads to cover the surface of the heater 931.

The liquid that has spread to cover the surface of the heater 931 in this way has a vector in the horizontal direction along the surface of the heater 931, and it crosses the surface of the heater 931. For example, the vector in the vertical direction vanishes, and it tends to stay on the surface of the heater 931, and it pulls down the liquid on the upper side thereof, that is, the liquid keeping the velocity vector in the discharge direction. After that, the liquid part Ib between the liquid that has spread on the surface of the heater 931 and the liquid on the upper side (main liquid droplet) becomes thin, and as shown in FIG. 21, at the time about 7 μs after the formation of the bubble 101, the liquid part Ib is cut off at the center of the surface of the heater 931, and it is divided into the main liquid droplet Ia keeping the velocity vector in the discharge direction and the liquid Ic that has spread on the surface of the heater 931. Thus, the division preferably occurs in a position in the liquid flow path 1338, and it is more preferable to be positioned on the electrothermal converting element 931 side from the ejection orifice 832.

The main liquid droplet Ia is discharged from the central part of the ejection orifice 832 with no deviation in the discharge direction, and with no discharge twist, and it lands on a predetermined position of the recording surface of the recording medium. Furthermore, the liquid Ic that has spread on the surface of the heater 931 should become a satellite droplet as a follower of the main liquid droplet to fly in the prior art, but it stays on the surface of the heater 931, and it is not discharged. Thus, the discharge of the satellite droplet can be inhibited, and therefore, the splash that is easily produced by the discharge of the satellite droplet can be prevented, and it is possible to surely prevent the staining of the recording surface of the recording medium because of the mist floating like fog. Herein, in FIG. 19 to FIG. 21, reference numeral Id denotes the ink adhered to the groove section (ink in the groove), and reference numeral Ie denotes the ink remaining in the liquid flow path.

Thus, in the liquid ejection head of this example, when the liquid is discharged at the step of decreasing of the volume after the bubble has grown to have the maximum volume, it is possible to stabilize the direction of the main liquid droplet at the time of discharge, by a plurality of grooves scattered around the ejection orifice. As a result of that, it is possible to provide a liquid ejection head with no twist in the discharge direction and with a high landing accuracy. Furthermore, since the discharge can stably be performed even when the bubbling is scattered at a high driving frequency, the high speed and highly fine printing can be realized.

Especially, at the step of decreasing of the volume of a bubble, this bubble is made to communicate with the atmosphere for the first time so that the liquid may be discharged, and therefore, it is possible to prevent the mist that occurs when the liquid droplet is discharged by making the bubble communicate with the atmosphere, and consequently, it is also possible to inhibit the state where the liquid droplet is adhered on the ejection orifice surface, which causes a so-called sudden ejection stop. Furthermore, as another embodiment of a discharge type recording head capable of being preferably used for the present invention in which the bubble is made to communicate with the atmosphere at the time of discharge, a so-called edge shooter type can be cited, for example, as described in Japanese Patent Registration No. 2,783,647.

In the above description, the invention is explained referring to an ink-jet recording apparatus of bubble-jet system, but ink-jet recording apparatuses of other ink-jet systems such as the piezoelectric system using piezoelectric elements may be employed.

EXAMPLES

The present invention will be described in further detail giving Examples and Comparative Examples. The ink compositions of Examples and Comparative Examples are expressed in part by weight, unless otherwise specified.

Inks were prepared by mixing the components, dissolving the mixture with stirring, and then filtering the solution through a 0.20 μm filter under pressure. Acetylenol EH (manufactured by Kawaken Fine Chemical) is a compound of general formula (II), wherein m+n=10.

| Composition of Magenta Ink 1 | |
|---|---|
| Exemplifying Compound 3 | 3.0 parts |
| Glycerol | 5.0 parts |
| Urea | 5.0 parts |
| Diethylene glycol | 10.0 parts |
| Acetylenol EH (manufactured by Kawaken Fine Chemical) | 0.3 parts |
| Ethanol | 5.0 parts |
| Ion-exchanged water | 71.7 parts |

| Composition of Magenta Ink 2 | |
|---|---|
| Exemplifying Compound 1 | 3.5 parts |
| Glycerol | 10.0 parts |
| Urea | 8.0 parts |
| Diethylene glycol | 7.0 parts |
| Acetylenol EH (manufactured by Kawaken Fine Chemical) | 1.0 part |
| Ion-exchanged water | 70.5 parts |

| Composition of Magenta Ink 3 | |
|---|---|
| Exemplifying Compound 7 | 4.0 parts |
| Glycerol | 10.0 parts |
| Urea | 8.0 parts |
| Diethylene glycol | 7.0 parts |
| Acetylenol EH (manufactured by Kawaken Fine Chemical) | 1.0 part |
| Ion-exchanged water | 70.0 parts |

| Composition of Magenta Ink 4 | |
|---|---|
| Exemplifying Compound 1 | 1.5 parts |
| Exemplifying Compound 7 | 2.0 parts |
| Glycerol | 5.0 parts |
| Urea | 5.0 parts |
| Diethylene glycol | 10.0 parts |
| Acetylenol EH (manufactured by Kawaken Fine Chemical) | 0.3 parts |
| Ethanol | 5.0 parts |
| Ion-exchanged water | 71.2 parts |

| Composition of Magenta Ink 5 | |
|---|---|
| C.I. Acid Red 289 | 3.0 parts |
| Glycerol | 10.0 parts |
| Urea | 8.0 parts |
| Diethylene glycol | 7.0 parts |
| Acetylenol EH (manufactured by Kawaken Fine Chemical) | 1.0 part |
| Ion-exchanged water | 71.0 parts |

| Composition of Magenta Ink 6 | |
|---|---|
| C.I. Reactive Red 180 | 3.5 parts |
| Glycerol | 5.0 parts |
| Urea | 5.0 parts |
| Diethylene glycol | 10.0 parts |
| Acetylenol EH (manufactured by Kawaken Fine Chemical) | 0.3 parts |
| Ethanol | 5.0 parts |
| Ion-exchanged water | 71.2 parts |

| Composition of Magenta Ink 7 | |
|---|---|
| Exemplifying Compound 7 | 4.0 parts |
| Glycerol | 5.0 parts |
| Urea | 5.0 parts |
| Diethylene glycol | 5.0 parts |
| N-methyl-2-pyrrolidone | 5.0 parts |
| Ethanol | 2.5 parts |
| Ion-exchanged water | 73.5 parts |

| Composition of Cyan Ink 1 | |
|---|---|
| C.I. Direct Blue 199 | 3.0 parts |
| Glycerol | 5.0 parts |
| Urea | 5.0 parts |
| Diethylene glycol | 10.0 parts |
| Acetylenol EH (manufactured by Kawaken Fine Chemical) | 0.3 parts |
| Ethanol | 5.0 parts |
| Ion-exchanged water | 71.7 parts |

| Composition of Cyan Ink 2 | |
|---|---|
| C.I. Direct Blue 307 | 3.5 parts |
| Glycerol | 10.0 parts |
| Urea | 8.0 parts |
| Diethylene glycol | 7.0 parts |
| Acetylenol EH (manufactured by Kawaken Fine Chemical) | 1.0 part |
| Ion-exchanged water | 70.5 parts |

| Composition of Cyan Ink 3 | |
|---|---|
| C.I. Direct Blue 199 | 3.0 parts |
| Glycerol | 5.0 parts |
| Urea | 5.0 parts |
| Diethylene glycol | 5.0 parts |
| N-methyl-2-pyrrolidone | 5.0 parts |
| Ethanol | 2.5 parts |
| Ion-exchanged water | 74.5 parts |

Examples 1 to 4 and Comparative Examples 1 to 3

The above magenta inks and cyan inks were matched as shown below.

TABLE 1

| | Ink Combination | |
|---|---|---|
| | Magenta Ink | Cyan Ink |
| Example 1 | Magenta ink 1 | Cyan ink 1 |
| Example 2 | Magenta ink 2 | Cyan ink 2 |
| Example 3 | Magenta ink 3 | Cyan ink 2 |
| Example 4 | Magenta ink 4 | Cyan ink 1 |
| Comparative Example 1 | Magenta ink 5 | Cyan ink 2 |
| Comparative Example 2 | Magenta ink 6 | Cyan ink 1 |
| Comparative Example 3 | Magenta ink 7 | Cyan ink 3 |

<Evaluation>

With inks of Examples 1 to 4 and Comparative Examples 1 to 3, printing was done by using an on-demand type ink jet printer (a product of Canon,), in which energy for ink ejection is supplied by a heat-generating element. Light fastness of the prints was evaluated as follows.

Light Fastness

A solid patch of blue color was printed on glossy paper (PR-101; manufactured by Canon) with magenta and cyan inks loaded on the printer. The resultant print was air-dried for 24 hours and exposed to light from a Xenon Fade Meter Ci 3000 (manufactured by Atlas) equipped with an ultraviolet light filter, at an irradiation intensity of 60 klux, for 100 hours (ambient temperature: 35° C., relative humidity: 55%). The color of the printed solid portion was measured before and after the test by using Spectrodensitometer X-rite 938 (trade name; manufactured by X-rite). The color difference ΔE before and after the test was determined from the calculated L*a*b*. The light fastness was evaluated in accordance with the following criteria.

A: $\Delta E \leq 5$ corresponding to no visual difference before and after the test.

B: $5 < \Delta E \leq 15$ corresponding to slight visual difference before and after the test.

C: $15 < \Delta E$ corresponding to large visual difference before and after the test.

TABLE 2

| Evaluation Results | |
|---|---|
| | Evaluation Result |
| Example 1 | A |
| Example 2 | A |
| Example 3 | A |
| Example 4 | A |
| Comparative Example 1 | C |

TABLE 2-continued

Evaluation Results

|  | Evaluation Result |
|---|---|
| Comparative Example 2 | C |
| Comparative Example 3 | B |

As a result, with the ink set of the present invention, no visual fading was observed after the light exposure at the color mixing portion. On the other hand, with inks of low penetrability, even though the inks contained the same coloring materials as Examples, slight fading was visually observed at the color mixing portion of the print. Further, even when the ink penetrability was high, unless the magenta ink contains the coloring material of the general formula (I), larger fading was visually observed at the color mixing portion of the print.

As described so far, according to the present invention, when printing is done on various types recording paper, color images excellent in light fastness can be provided particularly at the color mixing portion of magenta ink and cyan ink.

What is claimed is:

1. An ink set comprising a magenta ink and a cyan ink, the magenta ink comprising a coloring material of the following general formula (I) and a compound of the following general formula (II), and the cyan ink comprising a coloring material having a copper phthalocyanine structure and a compound of the following general formula (II):

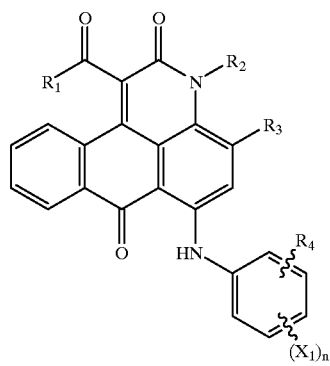

wherein $R_1$ is a substituted or unsubstituted aryl group, $R_2$ and $R_4$ are independently a hydrogen atom or a substituted or unsubstituted alkyl group, $R_3$ is a hydrogen atom, a substituted or unsubstituted alkyl group, a substituted or unsubstituted alkoxy group, a substituted or unsubstituted aryloxy group, or a halogen atom, $X_1$ is a carboxyl group or the salt thereof, or sulfonic acid group or the salt thereof, and n is 1 or 2;

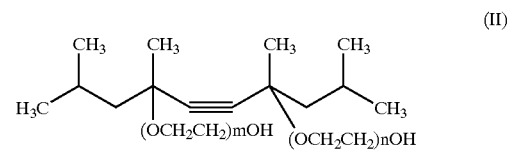

wherein $4 \leq m+n \leq 20$ where m and n are an integer of 0 or larger.

2. The ink set according to claim 1, wherein the magenta ink contains the coloring material in the range of 0.1 to 15.0% by weight of the magenta ink.

3. The ink set according to claim 1, wherein the magenta ink and the cyan ink contains the compound of general formula (II) in the range of 0.1 to 20% by weight of each ink.

4. The ink set according to claim 1, wherein each of the magenta ink and the cyan ink contains the compound of general formula (II) in the range of 0.5 to 5% by weight of the respective ink.

5. The ink set according to claim 1, wherein the magenta ink and the cyan ink are used for ink jet recording.

6. An ink jet recording method comprising a step of:

ejecting a magenta ink and a cyan ink respectively from orifices onto a recording medium according to a recording signal so as to overlap each other on the recording medium, wherein the magenta ink comprises a coloring material of general formula (I) and a compound of general formula (II), and the cyan ink comprises a coloring material having a copper phthalocyanine structure and a compound of general formula (II):

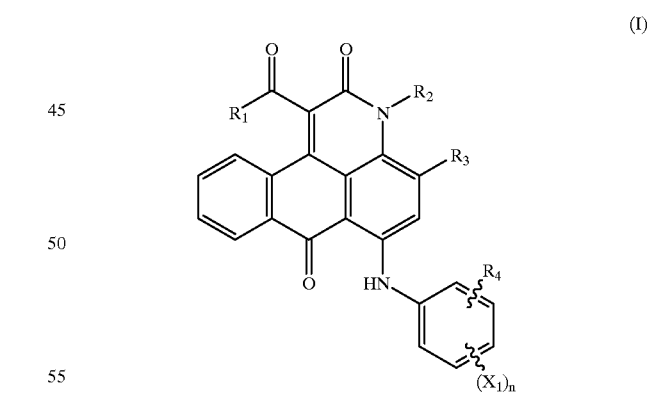

wherein $R_1$ is a substituted or unsubstituted aryl group, $R_2$ and $R_4$ are independently a hydrogen atom or a substituted or unsubstituted alkyl group, $R_3$ is a hydrogen atom, a substituted or unsubstituted alkyl group, a substituted or unsubstituted alkoxy group, a substituted or unsubstituted aryloxy group, or a halogen atom, $X_1$ is a carboxyl group or the salt thereof, or sulfonic acid group or the salt thereof, and n is 1 or 2, and

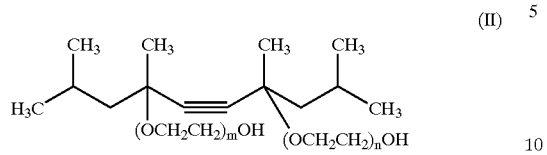

wherein $4 \leq m+n \leq 20$ where m and n are an integer of 0 or larger.

7. The ink jet recording method according to claim 6, wherein each of the magenta ink and the cyan ink contains the compound of general formula (II) in the range of 0.1 to 20% by weight of the respective inks.

8. The ink jet recording method according to claim 6, wherein each of the magenta ink and the cyan ink contains the compound of general formula (II) in the range of 0.5 to 5% by weight of the respective inks.

9. The ink jet recording method according to claim 6, wherein the inks are ejected by applying thermal energy thereto.

10. A recording unit comprising an ink container for containing respective inks constituting an ink set according to claim 5 and a head portion for ejecting the respective inks therefrom.

11. The recording unit according to claim 10, wherein the head portion comprises a recording head for ejecting the respective inks by applying thermal energy to the respective inks.

12. An ink cartridge comprising an ink containing portion which contains inks constituting an ink set according to claim 1.

13. An ink jet recording apparatus comprising a recording head for ejecting a magenta ink and a cyan ink, wherein the magenta ink comprises a coloring material of general formula (I) and a compound of general formula (II), and the cyan ink comprises a coloring material having a copper phthalocyanine structure and a compound of general formula (II):

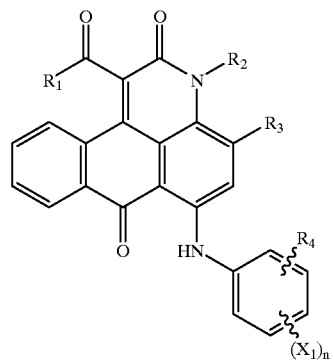

wherein $R_1$ is a substituted or unsubstituted aryl group, $R_2$ and $R_4$ are independently a hydrogen atom or a substituted or unsubstituted alkyl group, $R_3$ is a hydrogen atom, a substituted or unsubstituted alkyl group, a substituted or unsubstituted alkoxy group, a substituted or unsubstituted aryloxy group, or an halogen atom, $X_1$ is a carboxyl group or the salt thereof, or sulfonic acid group or the salt thereof, and N is 1 or 2;

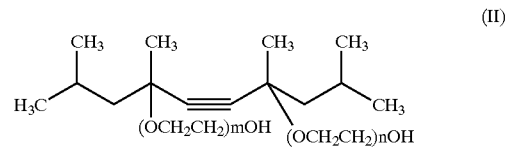

wherein $4 \leq m+n \leq 20$ where m and n are an integer of 0 or larger.

14. The ink jet recording apparatus according to claim 13, wherein the recording head ejects the respective inks by applying thermal energy to the respective inks.

* * * * *

UNITED STATES PATENT AND TRADEMARK OFFICE
CERTIFICATE OF CORRECTION

PATENT NO.    : 6,460,988 B1  
DATED         : October 8, 2002  
INVENTOR(S)   : Kumiko Mafune et al.

It is certified that error appears in the above-identified patent and that said Letters Patent is hereby corrected as shown below:

<u>Title page,</u>  
Item [56], References Cited, FOREIGN PATENT DOCUMENTS, "02016171 A" should read -- 2-16171 A --.

<u>Column 8,</u>  
Line 66, "or-the" should read -- or the --.

<u>Column 9,</u>  
Line 65, "silica is" should read -- silicas are --.

<u>Column 11,</u>  
Line 15, "denotes" should read -- denote --.

<u>Column 21,</u>  
Line 3, "n is 1 or 2, and" should read -- n is 1 or 2; --.

<u>Column 22,</u>  
Line 29, "N is 1 or 2;" should read -- n is 1 or 2; --.

Signed and Sealed this

Twenty-fourth Day of June, 2003

JAMES E. ROGAN  
*Director of the United States Patent and Trademark Office*